(12) United States Patent
Koike

(10) Patent No.: US 10,477,167 B2
(45) Date of Patent: Nov. 12, 2019

(54) IMAGE PROCESSING APPARATUS AND IMAGE PROCESSING METHOD

(71) Applicant: CANON KABUSHIKI KAISHA, Tokyo (JP)

(72) Inventor: Azusa Koike, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/812,799

(22) Filed: Nov. 14, 2017

(65) Prior Publication Data

US 2018/0160082 A1 Jun. 7, 2018

(30) Foreign Application Priority Data

Dec. 2, 2016 (JP) .................................. 2016-235367

(51) Int. Cl.
*H04N 9/31* (2006.01)
*H04N 9/77* (2006.01)
(52) U.S. Cl.
CPC ........... *H04N 9/312* (2013.01); *H04N 9/3138* (2013.01); *H04N 9/77* (2013.01)
(58) Field of Classification Search
CPC ......... H04N 9/312; H04N 9/3138; H04N 9/77
USPC ....................................................... 348/744
See application file for complete search history.

(56) References Cited

U.S. PATENT DOCUMENTS

| 7,822,269 | B2 | 10/2010 | Tsukada | |
|---|---|---|---|---|
| 2005/0213846 | A1* | 9/2005 | Matsuda | G03B 21/14 382/275 |
| 2007/0110304 | A1* | 5/2007 | Tsukada | H04N 1/6033 382/167 |
| 2008/0192115 | A1* | 8/2008 | Gindele | G02B 7/32 348/140 |
| 2010/0165193 | A1* | 7/2010 | Kanai | H04N 5/58 348/453 |
| 2010/0265403 | A1* | 10/2010 | Hikosaka | H04N 9/31 348/607 |
| 2011/0001881 | A1* | 1/2011 | Kawahara | H04N 9/3182 348/649 |
| 2014/0035893 | A1* | 2/2014 | Jackson | H04N 9/3147 345/207 |
| 2014/0152706 | A1* | 6/2014 | Park | G09G 3/2003 345/690 |

(Continued)

FOREIGN PATENT DOCUMENTS

| JP | 2015-138048 A | 7/2015 |
|---|---|---|
| WO | 2005/057941 A1 | 6/2005 |

*Primary Examiner* — Michael Lee
(74) *Attorney, Agent, or Firm* — Venable LLP

(57) ABSTRACT

An image processing apparatus comprise a correction unit configured to generate a corrected image from an input image using a correction value; an image processing unit configured to generate a first image, in which a first pattern for measuring an ambient light distribution is incorporated into the input image or the corrected image, and a second image that is different from the first image; an acquisition unit configured to acquire an ambient light distribution based on captured images of a region in which the first image and the second image are displayed while the first image and the second image are switched therebetween in the same frame; and a correction value calculation unit configured to calculate the correction value based on an ambient light distribution acquired by the acquisition unit.

18 Claims, 21 Drawing Sheets

(56) References Cited

U.S. PATENT DOCUMENTS

2015/0194091 A1\* 7/2015 Tusch ................ G09G 3/3291
  345/690
2015/0208052 A1 7/2015 Kobiki et al.
2016/0153833 A1\* 6/2016 Zhao .................... G01J 1/4204
  356/72

\* cited by examiner

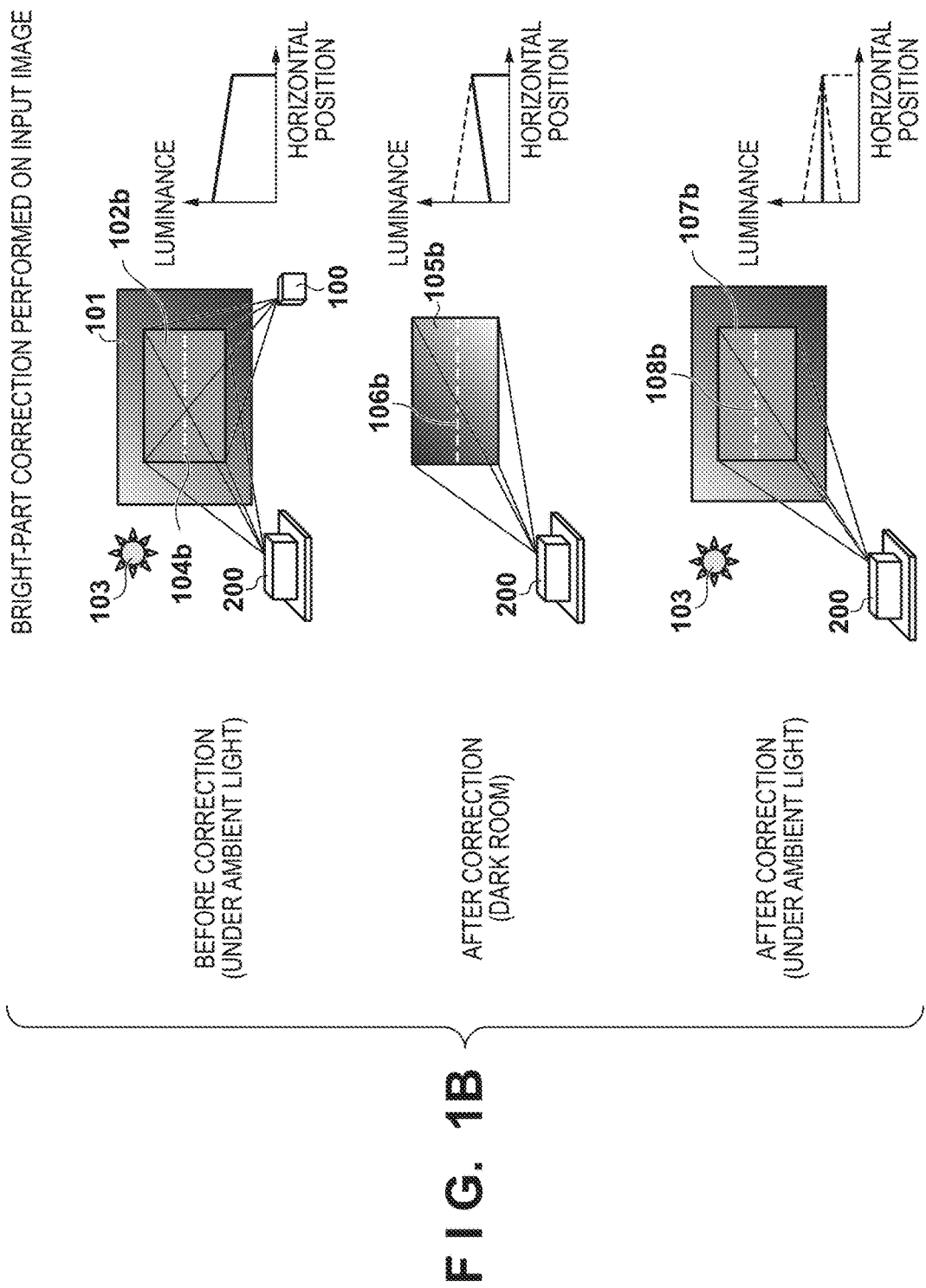

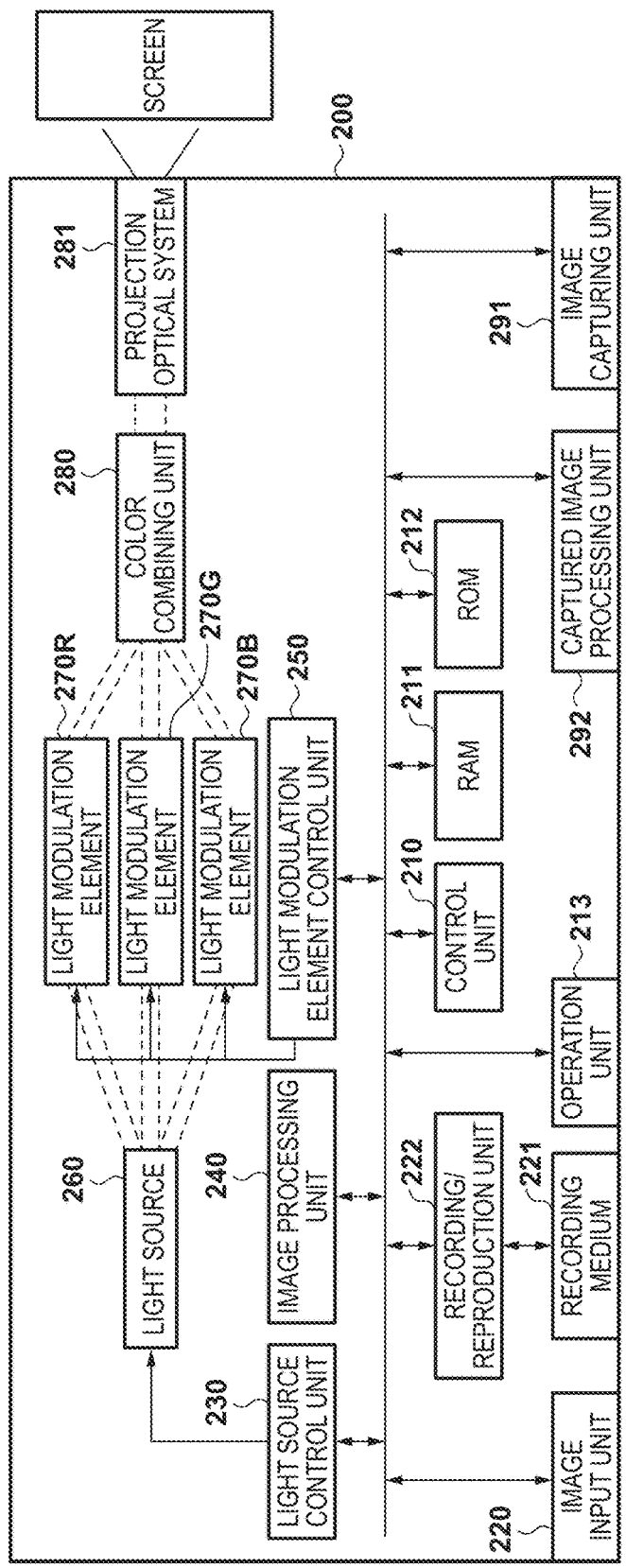

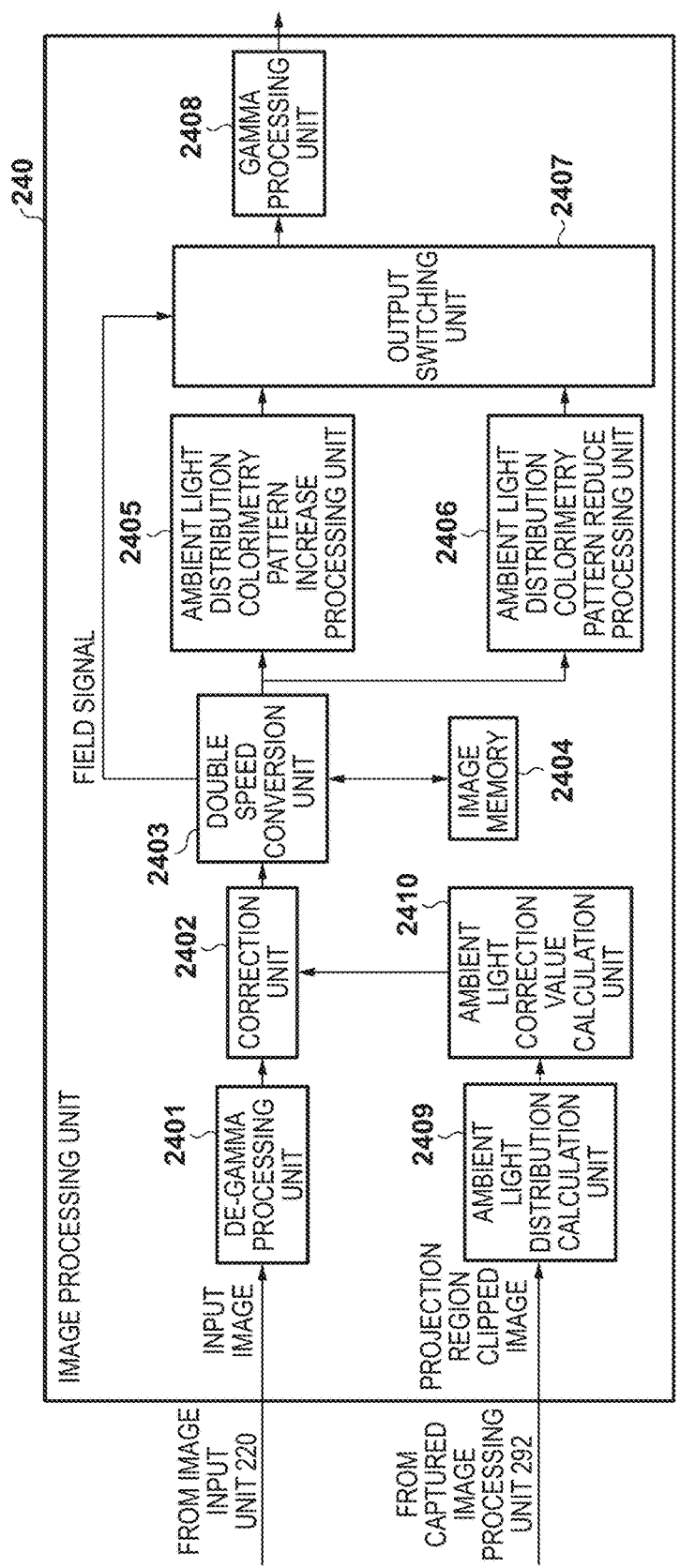

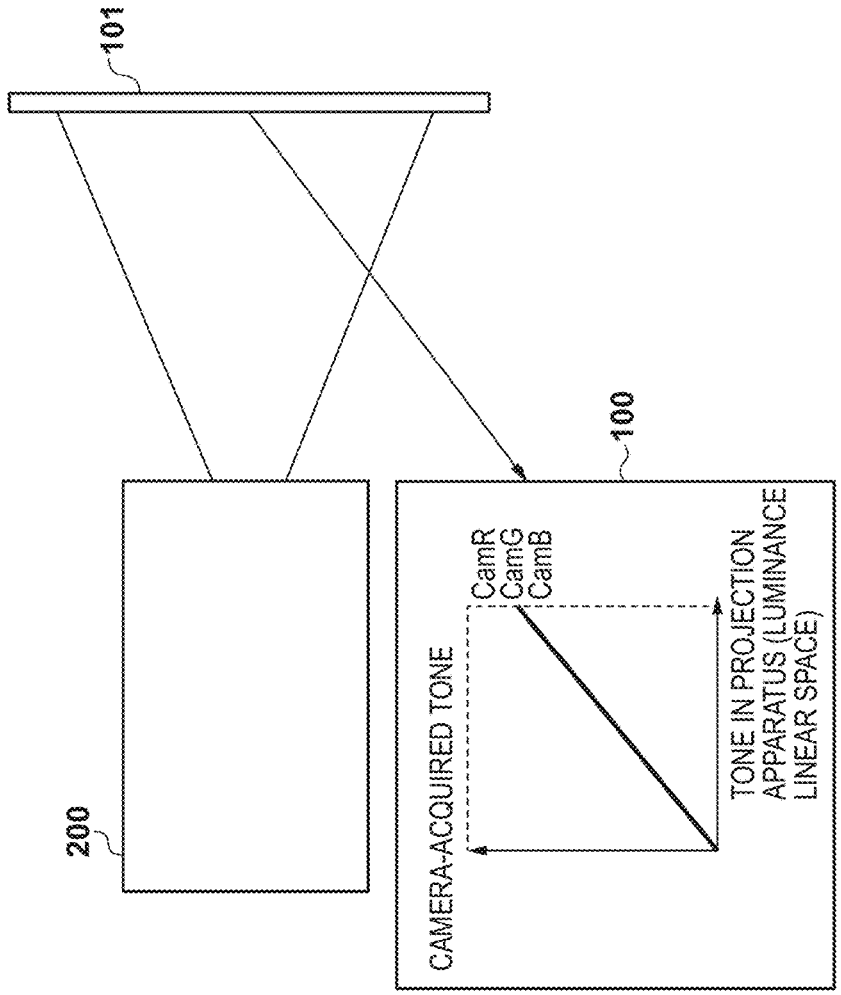

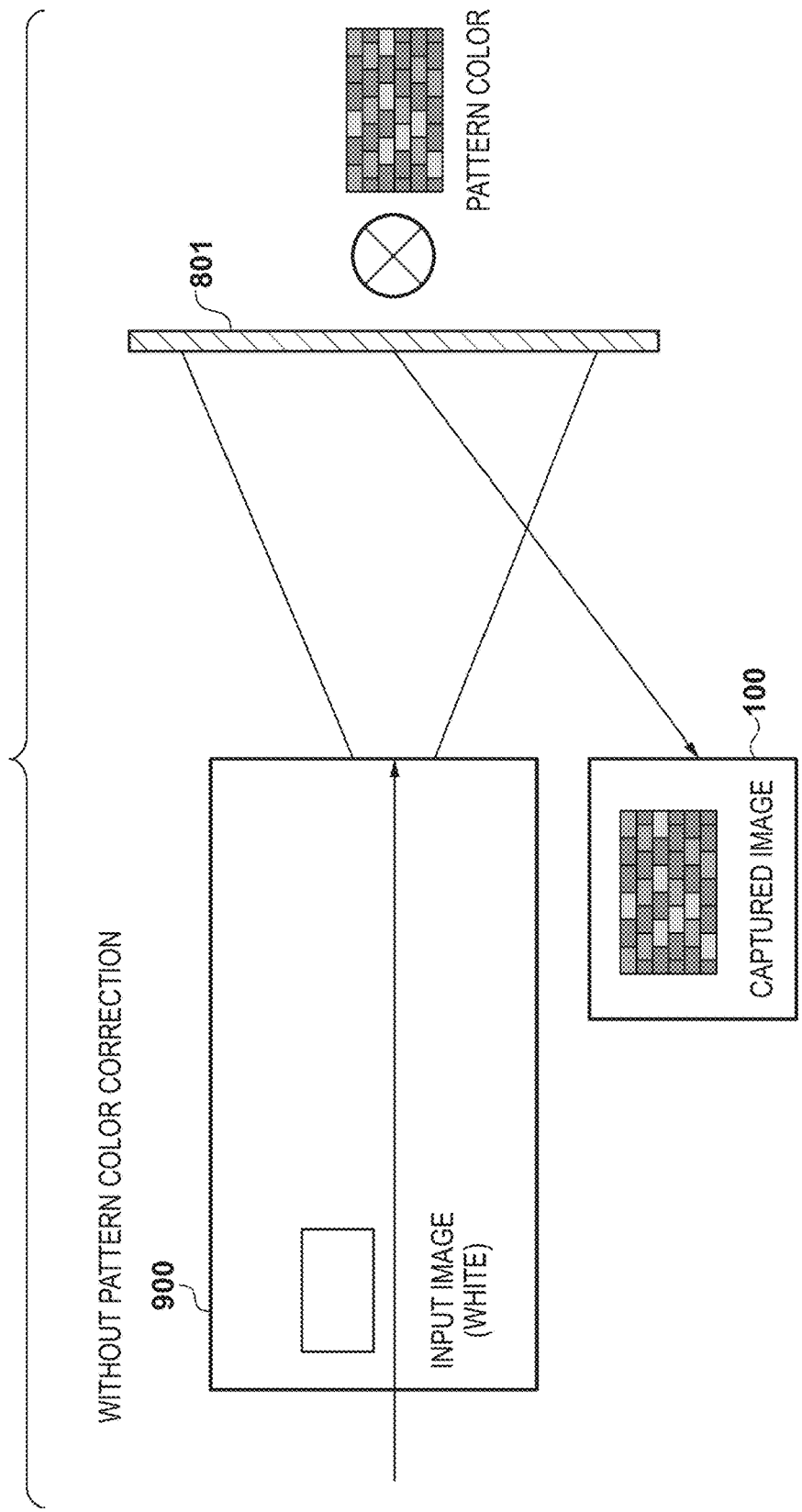

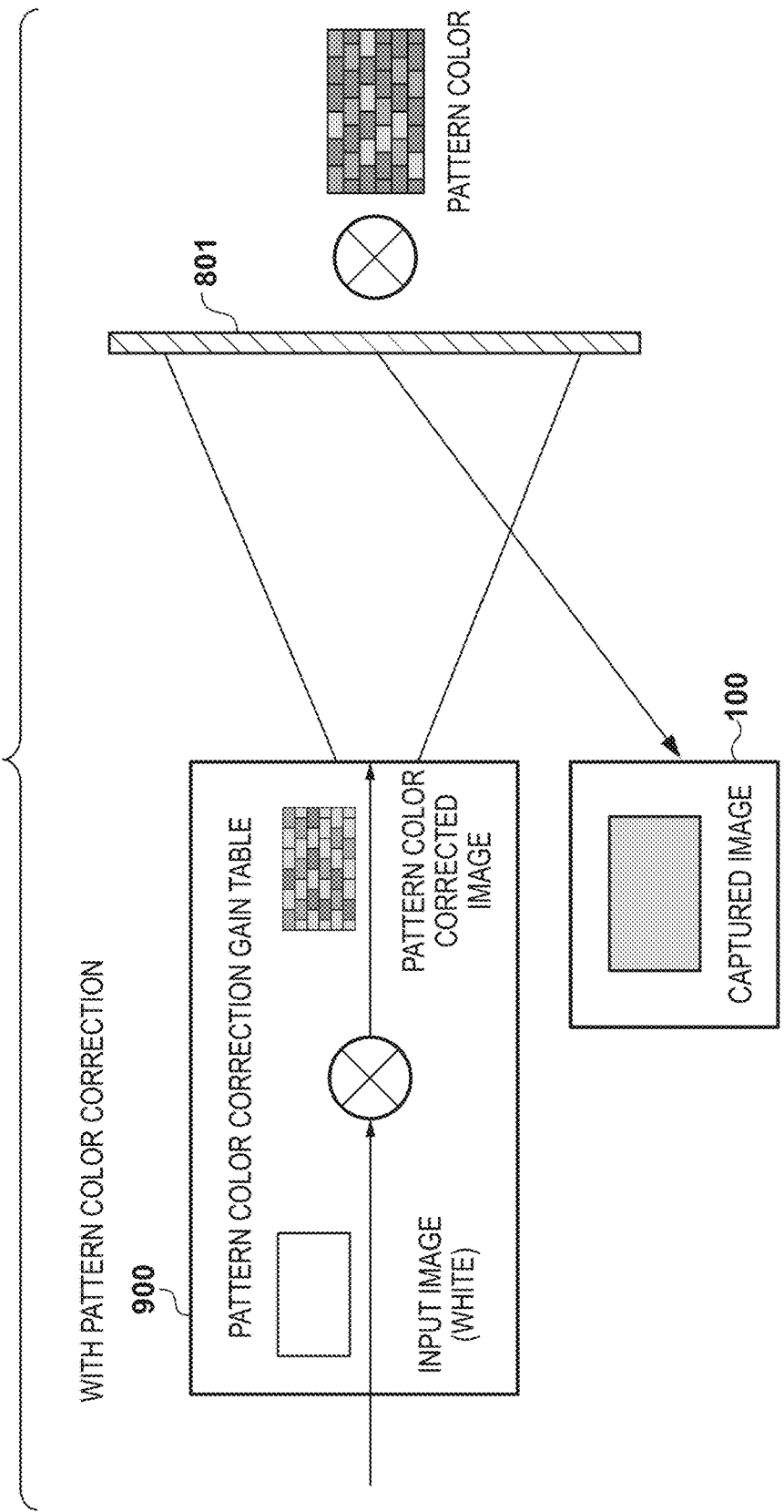

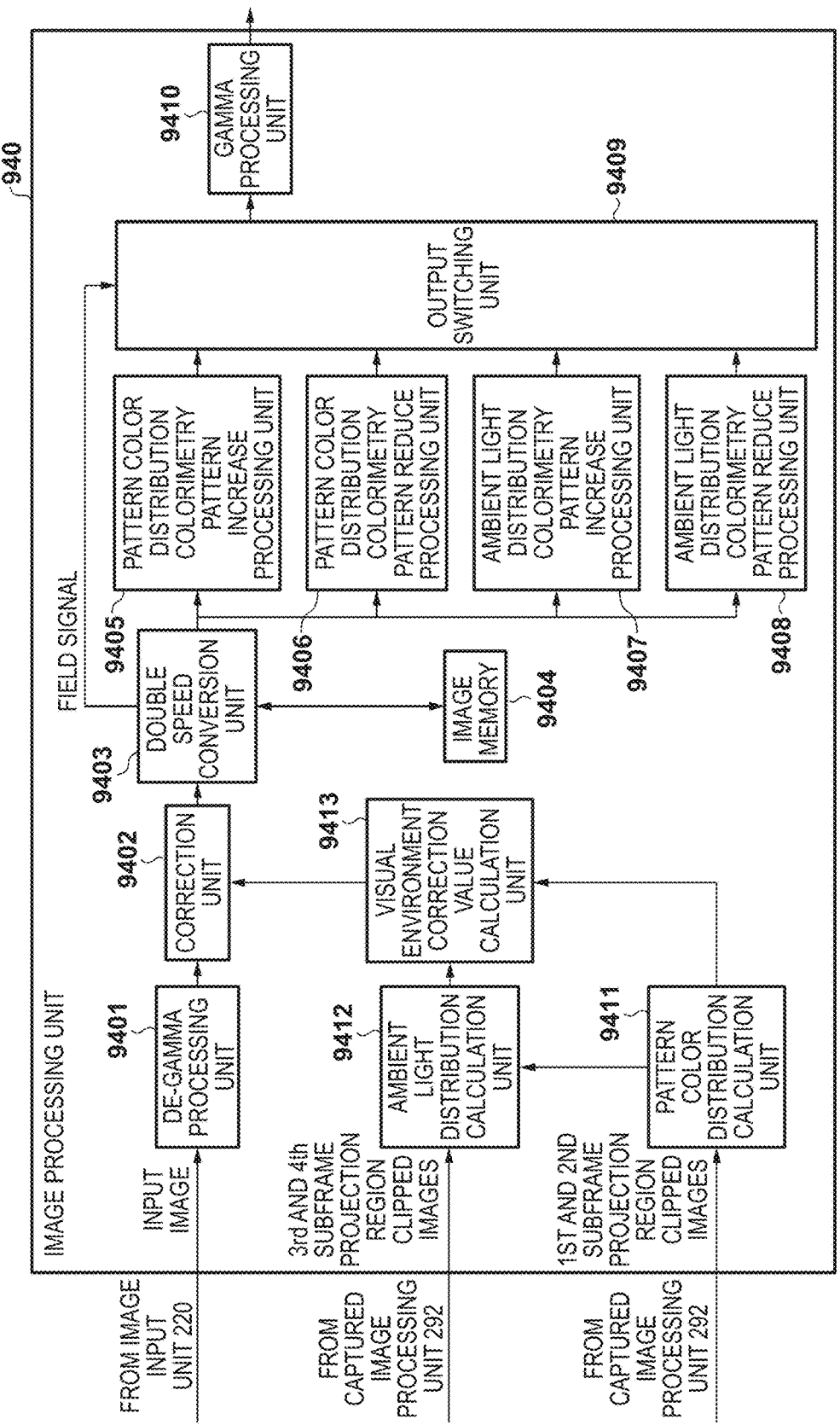

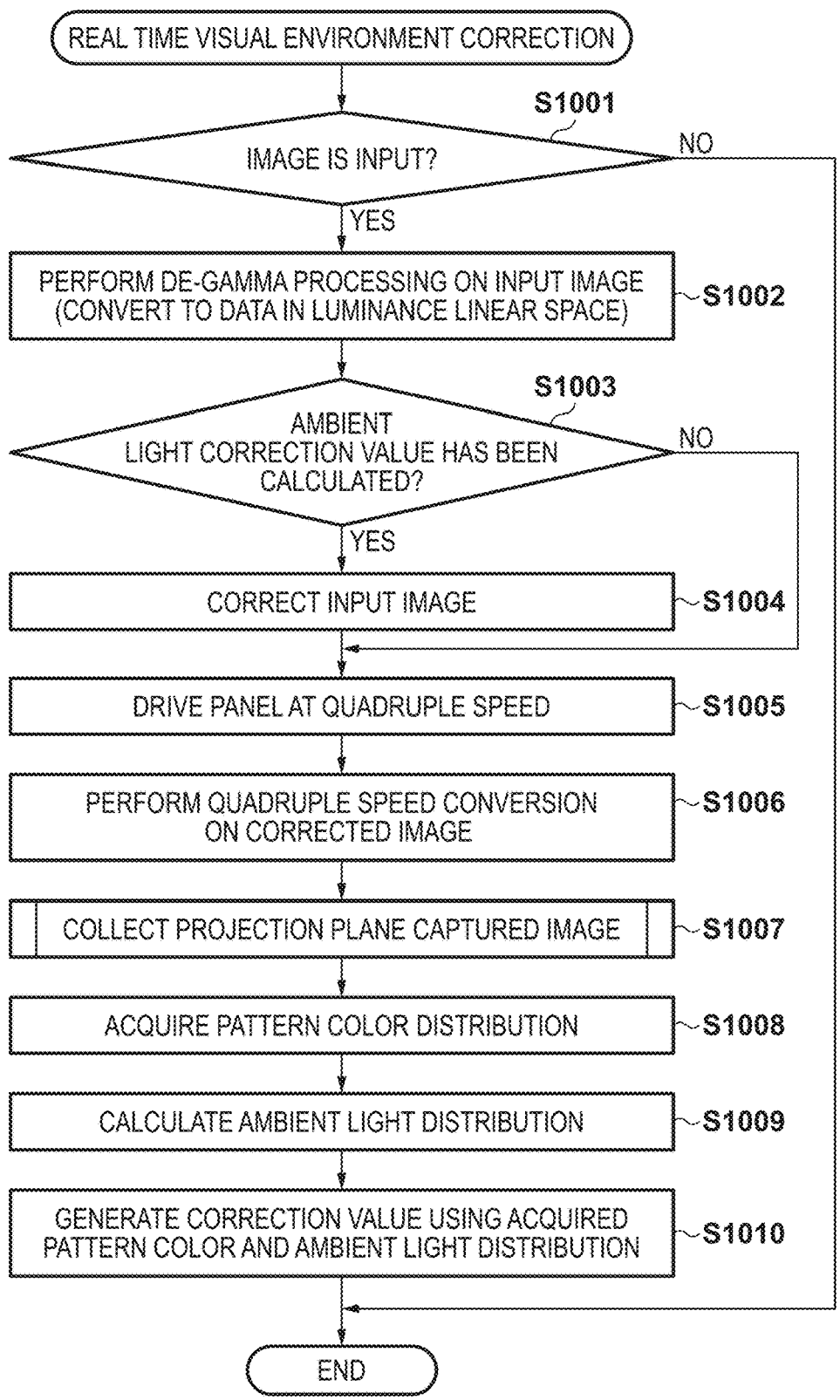

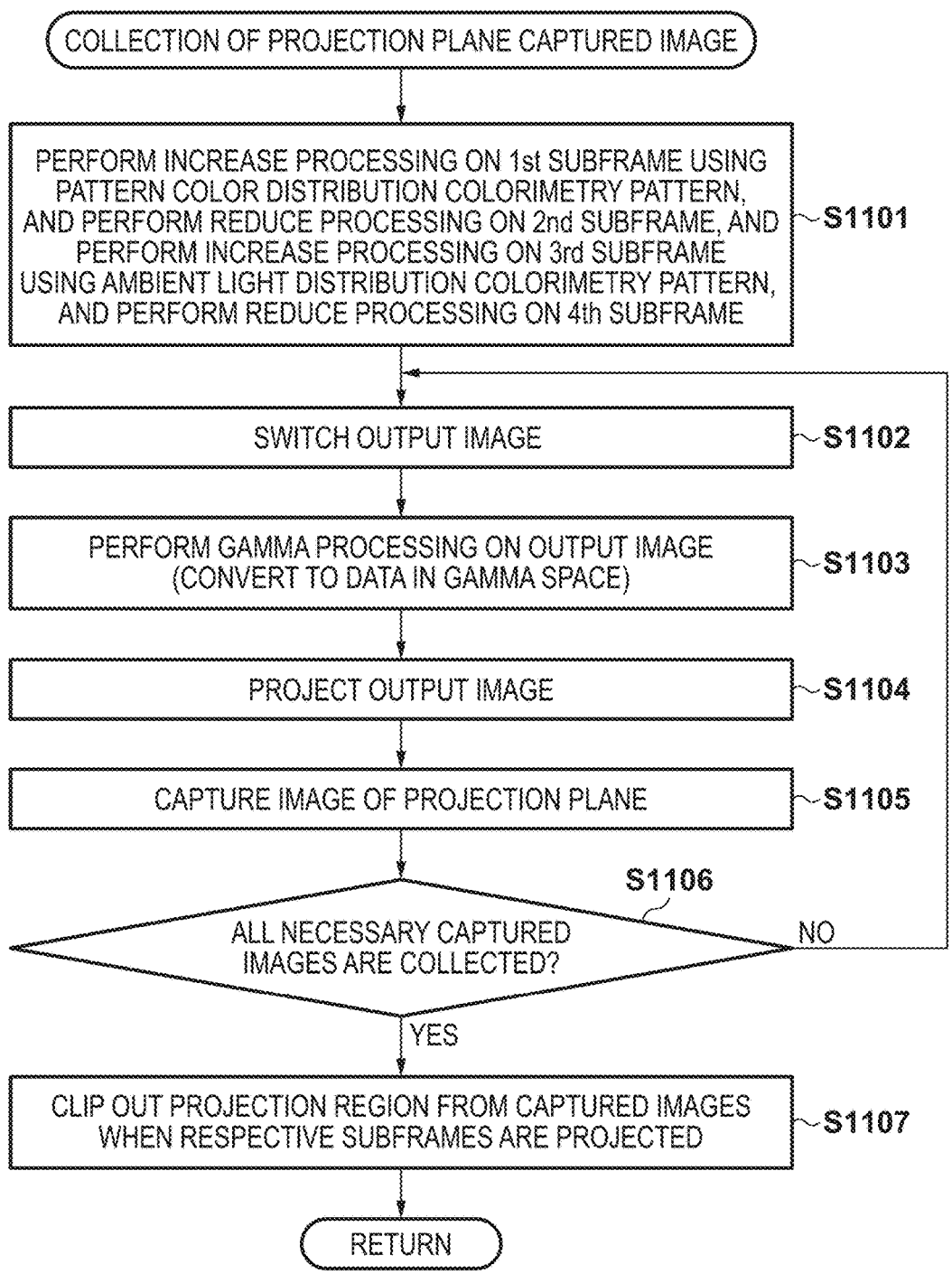
F I G. 11

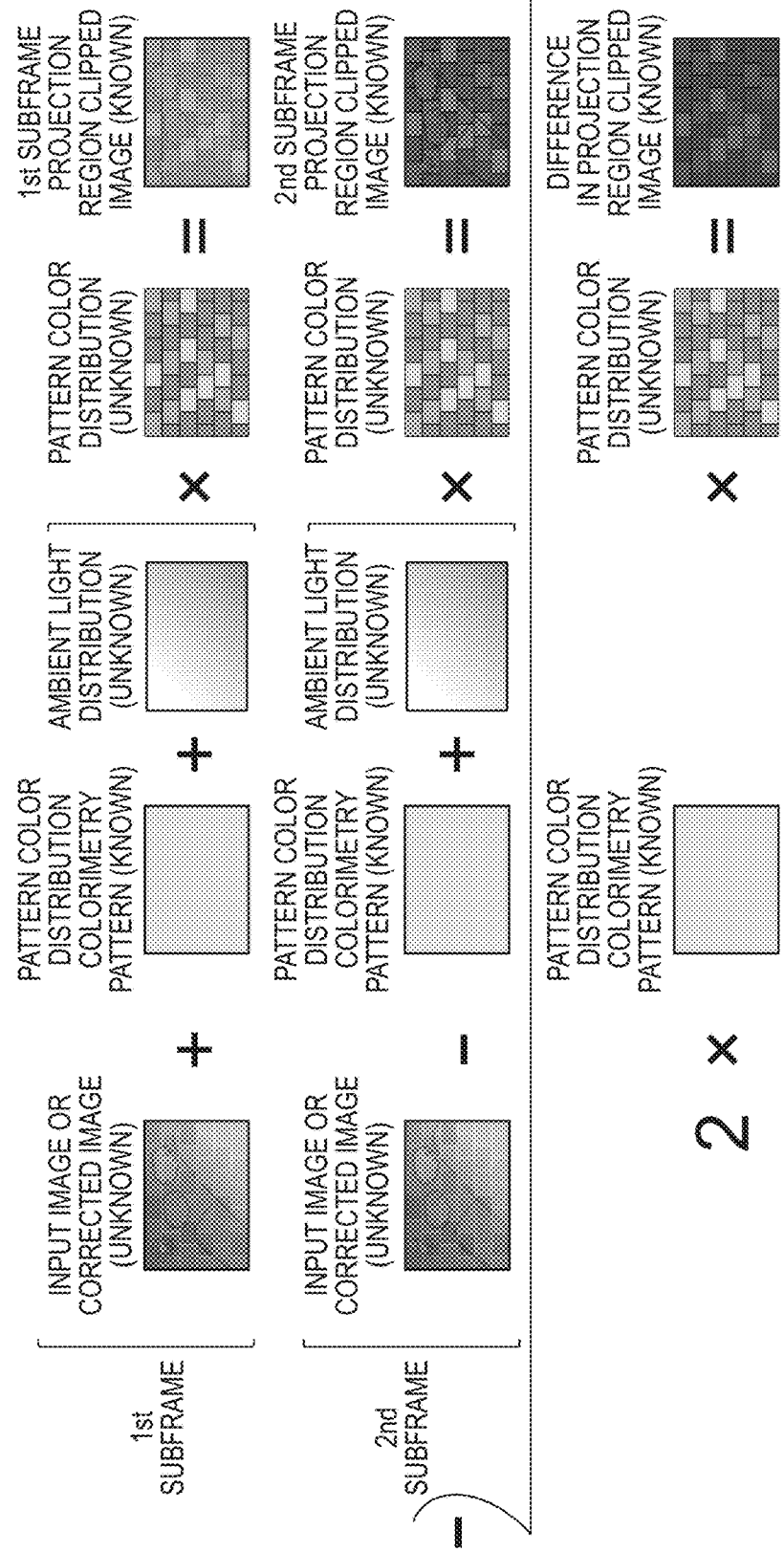

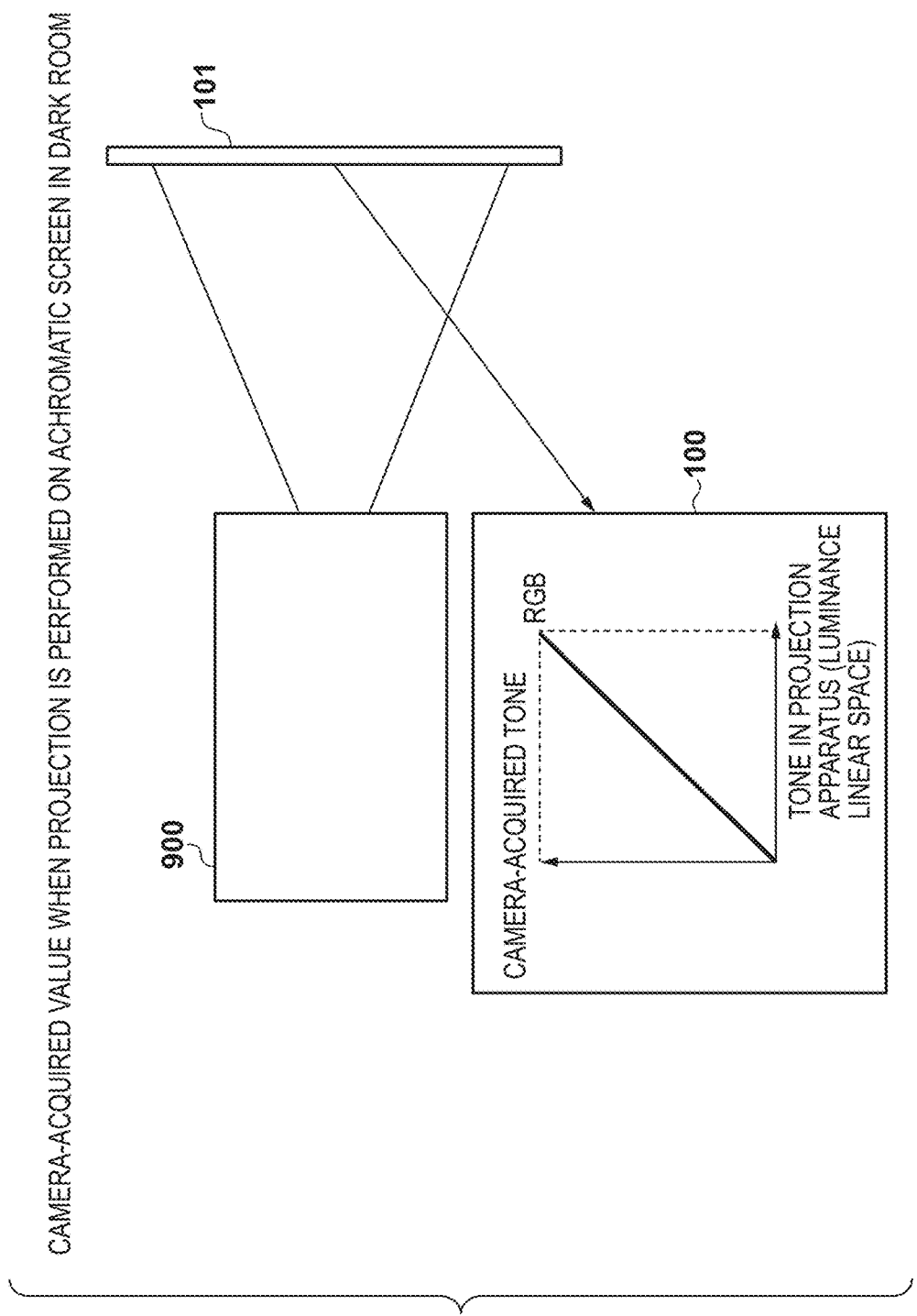

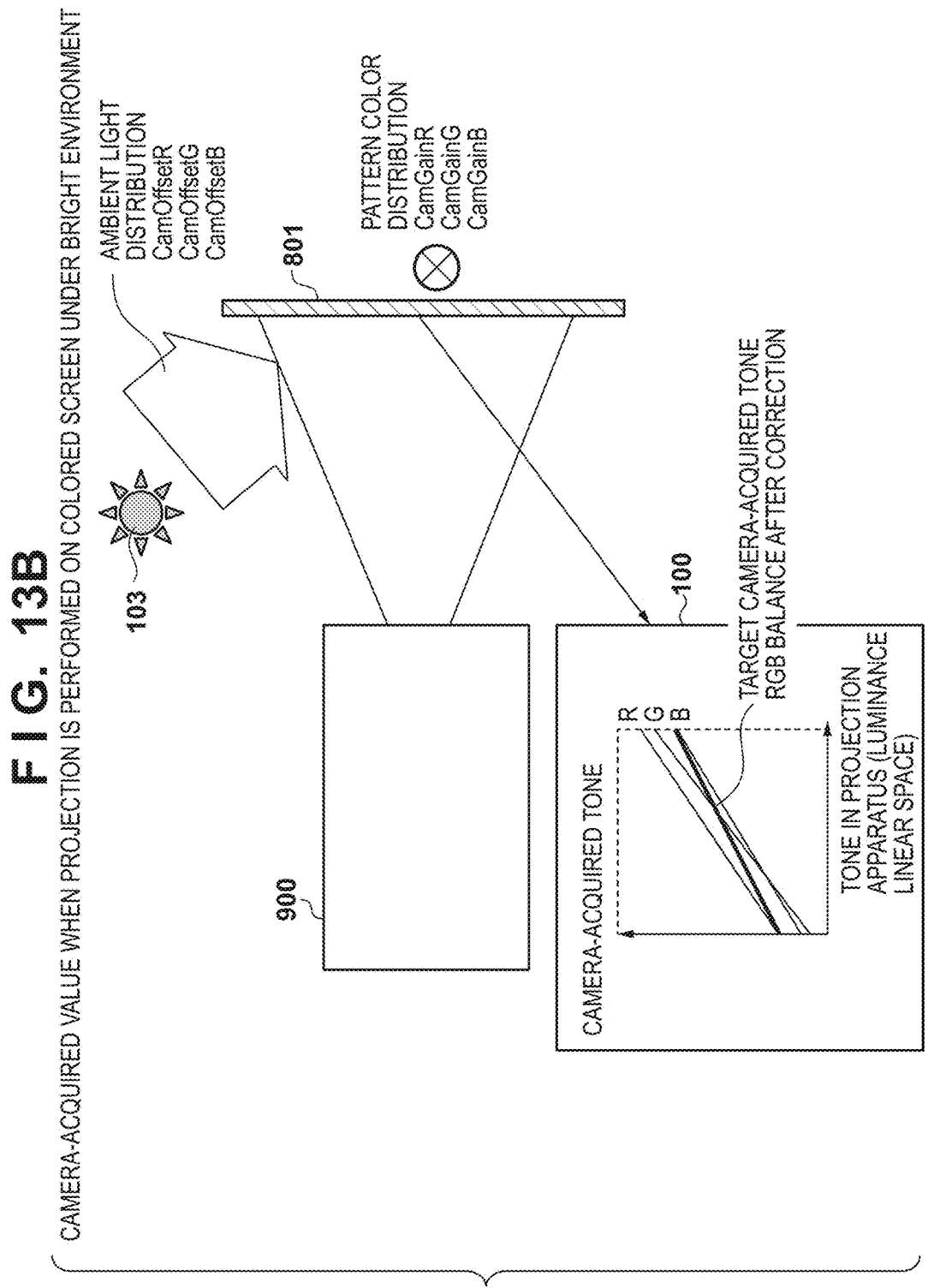

IMAGE PROCESSING APPARATUS AND IMAGE PROCESSING METHOD

BACKGROUND OF THE INVENTION

Field of the Invention

The present invention relates to an image processing technique for correcting ambient light distribution on a projection plane.

Description of the Related Art

Occasions in which projection apparatuses are used in a bright environment for applications such as projection mapping and signage are increasing. Unevenness occurs in the projection plane luminance distribution as a result of ambient light being incident on a projection plane. In this case, ambient light correction is performed such that the luminance or color on the projection plane is seen as uniform by applying a gain and offset for each area according to the projection plane luminance distribution.

In the case where content is projected by a projection apparatus, projection is normally performed in a dark environment in which the illumination of the room is reduced. In the case of projecting presentation material in a lecture room or a conference room, there are cases where projection is performed with the lighting of the room being turned on in order for people to enter and exit and to make note-taking easier. Furthermore, in recent years, as a result of expansion of the market of projection mapping and signage, the outdoor use of projection apparatuses is increasing. In the case of outdoor use, in many cases, the projection plane is exposed to ambient light such as sunlight or outdoor light, and it is difficult to perform projection in a pitch-black environment. Therefore, cases where projection is performed in a bright environment regardless of outdoor or indoor are sufficiently envisioned.

In the case where projection is performed in a bright environment as described above, the visibility of a projection plane is influenced as a result of ambient light being incident on the projection plane. FIG. 14 shows a case where projection is performed under ambient light, and illustrates a manner in which ambient light 1403 is incident on a projection plane 1401. When an image is projected onto the projection plane 1401 by a projection apparatus 1404, a luminance distribution 1402 occurs on the projection plane 1401.

In this case, the luminance distribution 1402 on the projection plane may be seen as colored due to the difference between the color temperature of a projected image and the color temperature of the ambient light 1403, for example. In the case of the sRGB and DCI standards, the color temperature is 6500 K. In contrast, a light bulb may have a low color temperature such as 3000 K. Also, in recent years, there is fluorescent light with a color temperature of 7000 K or more, which is suited for study. The luminance distribution 1402 on the projection plane is different in color from that when projection is performed in a dark room, due to the ambient light having various color temperatures.

Also, as a result of the ambient light 1403 being unevenly incident on the projection plane 1401, luminance unevenness in the luminance distribution 1402 on the projection plane may be visually recognized. The steeper the gradient in the ambient light intensity on the projection plane 1401, the more likely the luminance unevenness will be recognized. However, even if the gradient is gentle, when the projection image is dark, the luminance unevenness is more likely to be noticed. The ambient light normally influences the projection plane as an offset. Such unevenness in color and luminance due to the ambient light can be corrected by a gain and offset function of the projection apparatus.

However, when a test pattern such as an all-white image is projected in order to obtain the ambient light distribution on a projection plane, as described in International Publication No. 2005/057941, a user may visually recognize the pattern as flickering. That is, in the technique described in International Publication No. 2005/057941, an all-white image is projected as the test pattern, and the ambient light distribution on the projection plane is detected. If the all-white image is again projected in order to obtain the ambient light distribution while a dark image having a low reproduction frequency is projected, the user may visually recognize the pattern as flickering. Permanent exhibitions are gradually increasing in the field of projection mapping and signage, and it is highly possible that the projection plane will be seen by several people at any one time. In the case where it is highly possible that the flickering as described above can be seen, it is desirable that the test pattern is not projected as long as possible.

Also, in the technique described in Japanese Patent Laid-Open No. 2015-138048, a simulation image needs to be calculated from an input image, and if deformation processing such as color correction or curved surface correction other than the ambient light correction is performed in the projection apparatus, the operation processing increases in an amount corresponding to the processing for obtaining a simulation image from an input image.

SUMMARY OF THE INVENTION

The present invention has been made in consideration of the aforementioned problems, and realizes an image processing technique in which the operation processing load for correcting an ambient light distribution in a display region does not increase, and a test pattern can be displayed without being visually recognized by a user.

In order to solve the aforementioned problems, the present invention provides an image processing apparatus comprising: a correction unit configured to generate a corrected image from an input image using a correction value; an image processing unit configured to generate a first image, in which a first pattern for measuring an ambient light distribution is incorporated into the input image or the corrected image, and a second image that is different from the first image; an acquisition unit configured to acquire an ambient light distribution based on captured images of a region in which the first image and the second image are displayed while the first image and the second image are switched therebetween in the same frame; and a correction value calculation unit configured to calculate the correction value based on an ambient light distribution acquired by the acquisition unit.

In order to solve the aforementioned problems, the present invention provides an image processing method comprising: generating a corrected image from an input image by using a correction value; generating a first image, in which a first pattern for measuring an ambient light distribution is incorporated into the input image or the corrected image, and a second image that is different from the first image; acquiring an ambient light distribution based on captured images of a region in which the first image and the second image are displayed while the first image and the second image are switched therebetween in the same frame; and calculating the correction value based on the acquired ambient light distribution.

In order to solve the aforementioned problems, the present invention provides a computer-readable storage medium storing a program for causing a computer to execute an image processing method comprising: generating a corrected image from an input image by using a correction value; generating a first image, in which a first pattern for measuring an ambient light distribution is incorporated into the input image or the corrected image, and a second image that is different from the first image; acquiring an ambient light distribution based on captured images of a region in which the first image and the second image are displayed while the first image and the second image are switched therebetween in the same frame; and calculating the correction value based on the acquired ambient light distribution.

According to the present invention, the operation processing load for correcting an ambient light distribution in a display region does not increase, and a test pattern can be displayed without being visually recognized by a user.

Further features of the present invention will become apparent from the following description of exemplary embodiments (with reference to the attached drawings).

BRIEF DESCRIPTION OF THE DRAWINGS

FIGS. 1A and 1B are diagrams for describing an ambient light correction method.

FIGS. 2A and 2B are block diagrams illustrating an apparatus configuration of a first embodiment.

FIGS. 7A and 7B are diagrams for describing an ambient light correction value generation method.

FIGS. 8A and 8B are schematic diagrams illustrating pattern color correction.

FIGS. 9A and 9B are block diagrams illustrating an apparatus configuration of a second embodiment.

FIG. 10 is a flowchart illustrating ambient light correction processing of the second embodiment.

FIG. 11 is a flowchart illustrating processing for collecting a captured image of the second embodiment.

FIGS. 12A and 12B are diagrams for describing a method for detecting the ambient light and pattern color distribution of the second embodiment.

FIGS. 13A and 13B are diagrams for describing a method for generating the ambient light and pattern color correction value.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

Hereinafter, embodiments will be described in which the image processing apparatus of the present invention is applied to a projection apparatus such as a transmission type or reflection type projector that projects a still image or moving image, for example.

Ambient Light Correction Method

Figure 1A:
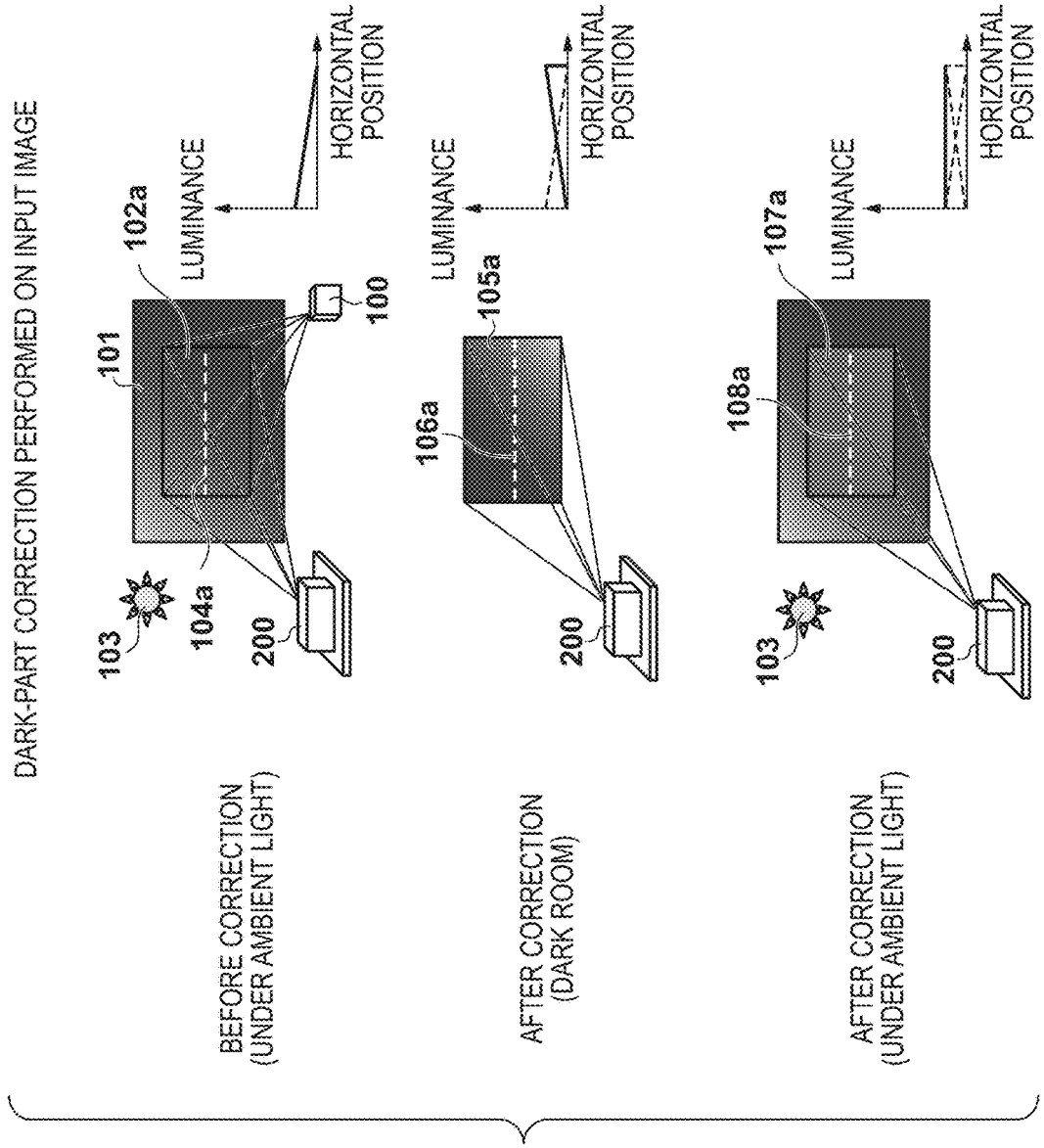

First, an outline of an ambient light correction method, which is a background of the present embodiment, will be described with reference to FIGS. 1A and 1B. For the sake of convenience in the description, only luminance information is described in FIGS. 1A and 1B. FIG. 1A illustrates an outline of dark-part correction processing performed on an input image, and FIG. 1B illustrates an outline of bright-part correction processing performed thereon. Also, upper parts in FIGS. 1A and 1B each show a situation, before correction, in which projection is performed under ambient light. Middle parts in FIGS. 1A and 1B each show a situation, after ambient light correction, in which projection is performed in a dark room. Lower parts in FIGS. 1A and 1B each show a situation, after correction, in which projection is performed under the ambient light.

First, the dark-part correction processing performed on an input image will be described using FIG. 1A. In FIG. 1A, in order to facilitate understanding, an all-black image is an input image, and is projected by a projection apparatus 200.

First, before ambient light correction, as shown in the upper part in FIG. 1A, ambient light 103 is incident on a projection plane 101, and luminance unevenness occurs on the projection plane. The pattern of the luminance unevenness is an example, and is not limited to being linear as illustrated. Also, hereinafter, the luminance unevenness on the projection plane due to ambient light is referred to as ambient light distribution. In the ambient light correction, normally, a projection plane luminance distribution 102a is captured by an image capturing apparatus 100, and a correction value is generated. Here, it is assumed that, when a luminance distribution on the straight line 104a on the projection plane is observed from the captured image, the luminance distribution is as shown in the graph in the upper part in FIG. 1A. In this case, since the input image is an all-black image, this luminance distribution is substantially the same as the ambient light distribution.

Next, ambient light correction is performed on the input image based on the ambient light distribution acquired by the image capturing apparatus 100, and a corrected image is generated. The result of projecting the corrected image in a dark room in which there is no ambient light is shown in the middle part in FIG. 1A. The luminance distribution on a straight line 106a on the projection plane with respect to a projection plane luminance distribution 105a in a dark room after correction is shown by the solid line in the graph in the middle part in FIG. 1A. The broken line shows the luminance distribution on the straight line 104a on the projection plane in the upper part in FIG. 1A. The solid line is calculated such that the result of adding the broken line thereto is a constant value. The detailed calculation method will be described later.

The result obtained by projecting the corrected image under the ambient light is shown in the lower part in FIG. 1A. As described above, since a constant value is obtained by adding the ambient light distribution and the projected light of the corrected image, the ambient light distribution on the projection plane is unlikely to be noticed, and a projection plane luminance distribution 107a under ambient light after correction is uniform. The luminance distribution on a straight line 108a on the projection plane with respect to the projection plane luminance distribution 107a after correction is constant as shown in the graph in the lower part in FIG. 1A.

On the other hand, the bright-part correction of the input image in FIG. 1B is the same, in the way of thinking, as the dark-part correction, from the viewpoint of making the ambient light distribution uniform. In FIG. 1B, in order to facilitate understanding, a case where an all-white image, which is the input image, is projected from the projection apparatus 200 is shown.

In contrast to the dark-part correction in which correction is performed by increasing the luminance of the input image for each region with respect to the ambient light distribution, in the bright-part correction, correction is performed by reducing the luminance. The projection plane luminance distribution before ambient light correction and under ambient light is as indicated by 102b, and the luminance distribution on a straight line 104b on the projection plane is as shown in the graph in the upper part in FIG. 1B.

The luminance distribution on the straight line 106b on the projection plane in a projection plane luminance distribution 105b in a dark room after correction with respect to the projection plane luminance distribution 102b is shown by the solid line in the graph of the middle part in FIG. 1B. The broken line shows the luminance distribution on the straight line 104b on the projection plane with respect to the projection plane luminance distribution 102b before correction. In the bright-part correction of an input image, the correction is performed such that the luminance of the input image is reduced so as to be a constant value when added together with the ambient light distribution.

The result of projecting the corrected image under the ambient light is shown in the lower part in FIG. 1B. The luminance distribution on the straight line 108b on the projection plane with respect to a projection plane luminance distribution 107b under the ambient light after correction is constant as shown by the solid line in the graph of the lower part in FIG. 1B.

Also, in order to perform ambient light correction, the ratio of the luminance intensity of the ambient light relative to the luminance intensity of the projection light of the projection apparatus needs to be known, and as a result, an all-white image is normally projected as an input image. The correction value is normally calculated by using a captured image of the projection plane when an all-white image is projected.

This ambient light correction is performed corresponding to a certain ambient light distribution, and is generated before an input image is projected after powering on the projection apparatus.

When the ambient light distribution changes, the ambient light distribution on the projection plane is again acquired, and the correction value needs to be generated.

This ambient light correction is corrected according to the ambient light distribution included in a projection plane luminance distribution, as described above. Therefore, when the ambient light distribution has changed, that is, when the projection plane 101 has moved or the projection apparatus 200 has moved, for example, the ambient light distribution needs to be acquired from a captured image of the projection plane. Also, in the case where the ambient light is sunlight, because the ambient light intensity, incidence angle, color temperature, and the like of the ambient light incident on the projection plane changes over time, it is necessary to acquire the ambient light distribution on the projection plane regularly and update the correction value.

First Embodiment

Hereinafter, a method in which the ambient light distribution is detected and correction is performed in real time will be described as a first embodiment according to the present invention.

Note that, in the present embodiment, processing will be described in which a test pattern for measuring the luminance and color on a projection plane is incorporated in an input image, the input image is displayed so as to not be visually recognized by a user, the displayed input image is captured by the image capturing apparatus 100 such that the ambient light distribution on the projection plane is detected in real time, and correction is performed.

Apparatus Configuration

First, an outline of the configuration and functions of the projection apparatus of the present embodiment will be described with reference to FIGS. 2A and 2B.

FIG. 2A is a block diagram illustrating a configuration of the projection apparatus of the present embodiment.

The projection apparatus 200 of the present embodiment controls the light transmittance (light intensity) of a light modulation element according to the image to be displayed on a projection plane, light from a light source that has passed through the light modulation element is projected onto a screen, and as a result, the image is presented to a user.

A control unit 210 includes a microcomputer including a CPU, a memory, and the like, and controls the operational blocks of the projection apparatus 200. A RAM 211 is a volatile memory that temporarily stores a control program and data, as a work memory. A ROM 212 is a nonvolatile memory that stores a control program in which a processing procedure of the control unit 210 is described. The control program and the data such as setting parameters of the operational blocks and a factory adjusted value are stored in the ROM 212. Also, the ROM 212 also includes a conversion matrix and a reverse conversion matrix for converting between the RGB value of an image captured by the image capturing apparatus 100 and the RGB output tone of the projection apparatus 200.

The control unit 210 can also temporarily store a still image file or a moving image file that a recording/reproduction unit 222 has read out from a recording medium 221, and reproduce a still image or a moving image corresponding to the image file using a program stored in the ROM 212. Also, the control unit 210 can also temporarily store a still image file or a moving image file received from an image input unit 220, and reproduce a still image or a moving image corresponding to the image file using a program stored in the ROM 212. Also, the control unit 210 can also temporarily store still image data or moving image data (hereinafter, collectively referred to as image data) that an image capturing unit 291 has obtained, in the RAM 211, generate a still image file or a moving image file using a program stored in the ROM 212, and store the image file in the recording medium 221.

An operation unit 213 is constituted by a switch, a dial, a touch panel provided on an unshown display unit, and the like, accepts a user operation, and transmits an operation signal to the control unit 210. Also, the operation unit 213 may be a unit that includes a signal receiving unit (such as an infrared receiving unit) that receives an operation signal transmitted from an unshown remote controller, and outputs the received operation signal to the control unit 210, for example. The control unit 210 controls the operational blocks of the projection apparatus 200 according to the operation signal received from the operation unit 213.

The image input unit 220 receives image information such as resolution and a frame rate along with image data from an unshown external apparatus. The image input unit 220 includes a composite terminal, an S-video terminal, a D terminal, a component terminal, an analog RGB terminal, a DVI-I terminal, a DVI-D terminal, an HDMI (registered trademark) terminal, a DisplayPort (registered trademark), and the like, for example. Also, in the case of receiving analog image data, the image input unit 220 converts the received analog signal into a digital signal, and transmits the digital signal to an image processing unit 240. Here, the external apparatus may be any apparatus that can at least output image data such as a personal computer, a camera, a cellular phone, a smartphone, a hard disk recorder, and a game machine.

The recording/reproduction unit 222 reproduces a still image file or a moving image file that has been read out from the recording medium 221, and also, receives image data obtained by the image capturing unit 291 from the control unit 210 and stores the received image data in the recording medium 221. Also, the recording/reproduction unit 222 may store the still image file or moving image file received from the image input unit 220 in the recording medium 221. The recording medium 221 can store a still image file, a moving image file, and, in addition thereto, control data that is necessary for the projector of the present embodiment, and the like. Various types of recording mediums can be used as the recording medium 221, such as a magnetic disk, an optical disk, or a semiconductor memory, and the recording medium 221 may be a detachable recording medium, or a built-in recording medium.

A light source control unit 230 controls the turning on/off of a light source 260 and the light amount thereof. The light source 260 irradiates light modulation elements 270R, 270G, and 270B with light in order to output light for projecting an image on a screen. Also, the light source 260 may be a halogen lamp, a xenon lamp, a high-pressure mercury lamp, an LED light source, a laser diode, or a light source of a type that performs wavelength conversion by exciting a fluorescent material or the like with light emitted from a laser diode, or the like, for example, and the light source 260 outputs light for projecting an image on a screen.

The image processing unit 240 performs processing for changing a frame number, a pixel number, an image shape, and the like on image data received from the image input unit 220, and transmits the processed data to a light modulation element control unit 250. Also, the image processing unit 240 can execute functions such as frame thinning processing, frame interpolation processing, resolution conversion processing, and geometric correction processing (keystone correction processing). Also, the image processing unit 240 can perform the aforementioned change processing on an image such as a moving image or a still image reproduced by the recording/reproduction unit 222 in addition to the image data received from the image input unit 220. A detailed configuration of the image processing unit 240 will be described later.

The light modulation element control unit 250 controls voltages applied to the red (R), green (G), and blue (B) light modulation elements 270R, 270G, and 270B based on image data processed by the image processing unit 240 so as to modulate the red (R), green (G), and blue (B) light intensities. The light modulation element 270R adjusts the red light intensity of light output from the light source 260. The light modulation element 270G adjusts the green light intensity of light output from the light source 260. The light modulation element 270B adjusts the blue light intensity of light output from the light source 260.

The light modulation elements 270R, 270G, and 270B are controlled by the light modulation element control unit 250 so as to produce light having a light intensity corresponding to the image data input from the image processing unit 240. Therefore, when the light combined by a color combining unit 280 is projected onto a screen by a projection optical system 281, a still image or a moving image corresponding to the still image data or the moving image data input from the image processing unit 240 is displayed on the screen.

The color combining unit 280 is constituted by a dichroic mirror or a prism, for example, and combines red (R) light, green (G) light, and blue (B) light that were respectively modulated by the light modulation elements 270R, 270G, and 270B. Then, the light generated through combining red (R), green (G), and blue (B) components with the color combining unit 280 is sent to the projection optical system 281.

The projection optical system 281 projects the combined light output from the color combining unit 280 onto a screen. The projection optical system 281 is constituted by a plurality of lenses and actuators for driving the lenses, and can perform enlargement, reduction, shifting, focus adjustment, and the like on the projection image by driving the lenses using the actuators.

The image capturing unit 291 is provided so as to capture an image of a projection plane of the projection apparatus 200 and generate image data, and shoots (shoots in a direction of the screen) a still image or a moving image projected via the projection optical system 281. The control unit 210 temporarily stores the image data obtained by the image capturing unit 291 in the RAM 211, converts the image data into a still image file or a moving image file using a program stored in the ROM 212, and stores the image file in the recording medium 221. The image capturing unit 291 includes a lens group including a zoom lens and a focus lens that form an optical image of a subject, actuators that drive the lens group, and a microprocessor that controls the actuators. Also, the image capturing unit 291 includes an image sensor such as CCD or CMOS that converts the subject image formed by the lens group to an electric signal, an A/D conversion unit that converts an analog signal obtained by the image sensor into a digital signal, and the like.

A captured image processing unit 292 generates a projection region clipped image that is obtained by clipping out a projection region that shows the projection plane luminance distribution from the captured image obtained by the image capturing unit 291. Also, the captured image processing unit 292 includes a memory that can store a captured image or a projection region clipped image.

Note that the light source control unit 230, the image processing unit 240, and the light modulation element control unit 250 of the present embodiment may each be a single or a plurality of microprocessors that can perform processing similarly to the unit, or an ASIC or the like constituted by a logic circuit. Also, the control unit 210 may execute processing similarly to each of the operational blocks by a program stored in the ROM 212, for example.

FIG. 2B shows a detailed configuration of the image processing unit 240.

A de-gamma processing unit 2401 performs de-gamma processing on an input image, and converts the input image to data in a luminance linear space.

A correction unit 2402 corrects the input image by applying a calculated ambient light correction value to the input image that has been converted to data in the luminance linear space, and generates a corrected image.

A double speed conversion unit 2403 writes each piece of input frame image data in an image memory 2404, and generates a plurality of pieces of subframe image data with respect to one piece of input frame image data. The double speed conversion unit 2403 is configured such that reading out from the image memory 2404 can be performed twice in a period in which one instance of writing to the image memory 2404 is performed. Alternatively, the double speed conversion unit 2403 may be configured such that a read out from the image memory 2404 can be performed at a speed that is twice the speed at the time when the image memory 2404 is written. That is, the double speed conversion unit 2403, in the case where the frequency of a vertical synchronizing signal of the input frame image is 60 Hz, generates two pieces of subframe image data at a period corresponding to 120 Hz. Also, the plurality of pieces of subframe image data generated by the double speed conversion unit 2403 is image data that is the same as the input frame image data. That is, pieces of pixel data at the same pixel position in the plurality of pieces of subframe image data generated by the double speed conversion unit 2403 have the same tone.

Note that, in the present embodiment, the double speed conversion unit 2403 generates two subframe images, the subframe image generated first is referred to as a $1^{st}$ subframe (first image), and the subframe image generated next is a $2^{nd}$ subframe (second image). Also, the double speed conversion unit 2403 generates, at the same time as generating each subframe, a field signal for identifying which of the $1^{st}$ subframe and $2^{nd}$ subframe the generated subframe is, and outputs the generated field signal to an output switching unit 2407.

The corrected image is written in and temporarily saved in the image memory 2404.

An ambient light distribution colorimetry pattern increase processing unit (hereinafter, increase processing unit) 2405 performs processing in which a $1^{st}$ subframe image generated by the double speed conversion unit 2403 is increased by a test pattern (hereinafter, ambient light distribution colorimetry pattern) for detecting the ambient light distribution in a projection environment. The increase processing may be multiplication processing or a combination of multiplication processing and addition processing. As a result, the $1^{st}$ subframe image is an image that is different from the input image or a corrected image. The details will be described later.

An ambient light distribution colorimetry pattern reduce processing unit (hereinafter, reduce processing unit) 2406 performs processing in which the ambient light distribution colorimetry pattern is reduced from a $2^{nd}$ subframe image generated by the double speed conversion unit 2403. The reduce processing may be multiplication processing or a combination of multiplication processing and subtraction processing. As a result, the $2^{nd}$ subframe image becomes an image that is different from the input image and the corrected image. The details will be described later.

An output switching unit 2407 alternatingly switches between the output from the increase processing unit 2405 and the output from the reduce processing unit 2406 in accordance with the field signal from the double speed conversion unit 2403 in synchronization with the vertical synchronizing signal of subframes after double speed conversion. That is, the output switching unit 2407 alternatingly outputs $1^{st}$ subframe data output from the increase processing unit 2405 and $2^{nd}$ subframe data output from the reduce processing unit 2406.

A gamma processing unit 2408 applies the gamma of the display apparatus, and converts the image output from the output switching unit 2407 to data in a gamma space.

An ambient light distribution calculation unit 2409 calculates the ambient light distribution from a $1^{st}$ subframe projection region clipped image and a $2^{nd}$ subframe projection region clipped image generated by the captured image processing unit 292. Here, the ambient light distribution refers to an RGB offset value for each panel pixel that can be obtained according to the ambient light intensity.

An ambient light correction value calculation unit 2410 calculates an ambient light correction value for correcting the luminance and color appearance on the projection plane, from the calculated ambient light distribution. Here, the ambient light correction value is a matrix of the RGB gain and offset for each panel pixel, and the luminance and color on the projection plane can be corrected by applying the ambient light correction value to the input image.

Ambient Light Correction Processing

Next, the ambient light correction processing of the present embodiment will be described using FIGS. 3 and 4.

Hereinafter, the processing (hereinafter, real-time ambient light correction) in which the ambient light distribution in a projection region is detected without being visually recognized by a user, by using the projection apparatus 200, and the luminance and color appearance of a projection target is corrected will be described.

Figure 3:
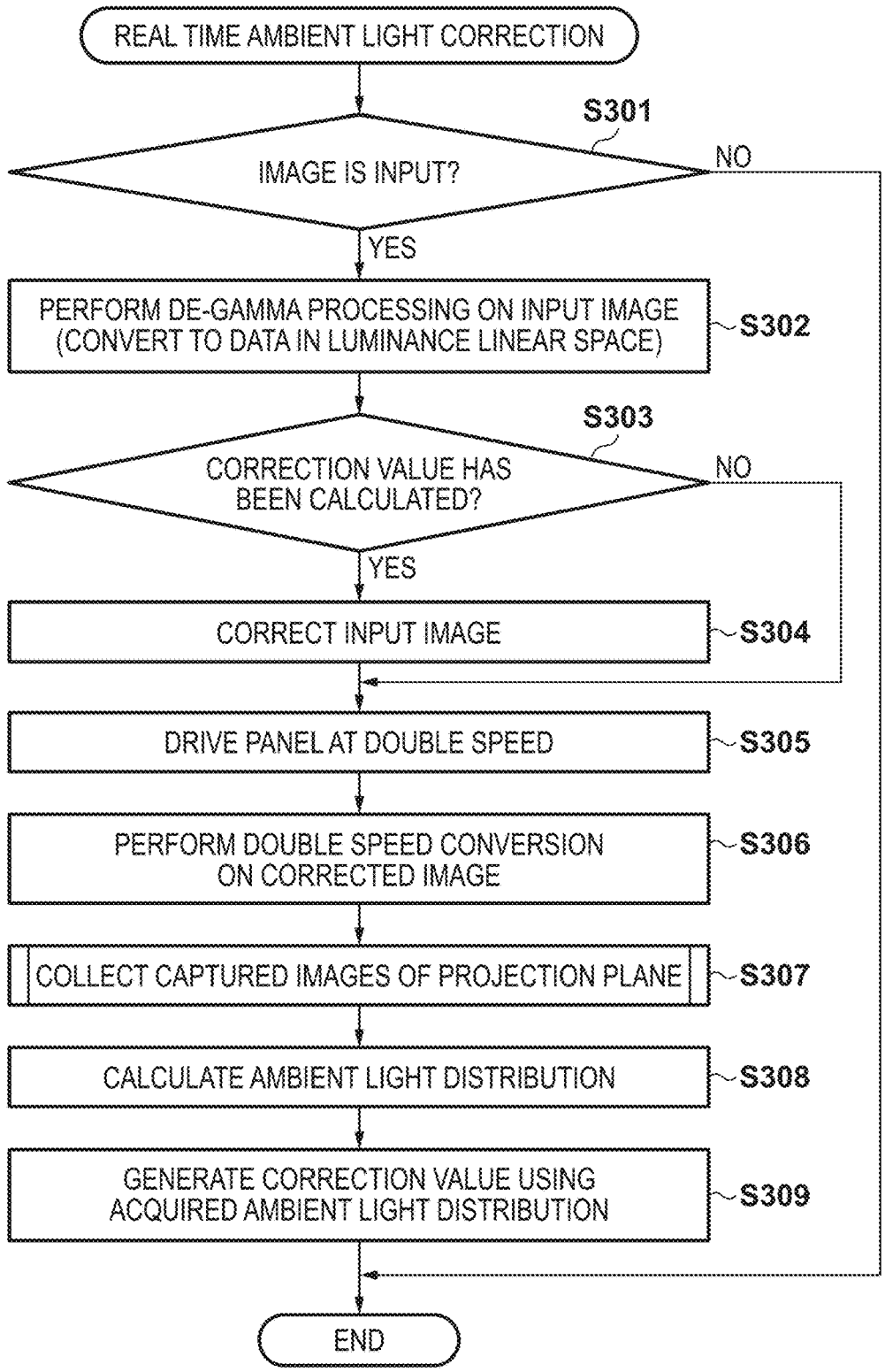
FIG. 3 is a flowchart illustrating ambient light correction processing of the first embodiment.

FIG. 3 is a flowchart illustrating the real-time ambient light correction processing of the present embodiment. Note that the processing in FIG. 3 is realized by the control unit 210 loading a program stored in the ROM 212 to a work area in the RAM 211 and controlling the operational blocks. Also, the processing of FIG. 3 is executed when an instruction to start the real-time ambient light correction processing that has been issued by a user operation made on a remote controller or the operation unit 213 has been accepted. The same applies to FIGS. 4, 10, and 11, which will be described later.

In step S301, the control unit 210 controls the image input unit 220 and the recording/reproduction unit 222 and determines whether or not an image has been input to the projection apparatus 200. If the determination result indicates that an image has been input, the processing advances to step S302, and if an image has not been input, the processing is ended.

In step S302, the control unit 210 controls the image processing unit 240, and the image processing unit 240 converts the input image to data in a luminance linear space using the de-gamma processing unit 2401. The de-gamma processing unit 2401 performs de-gamma processing on the input image, and the input image is converted to data in the luminance linear space.

In step S303, the control unit 210 controls the image processing unit 240, and the image processing unit 240 determines whether or not an ambient light correction value has been calculated by the ambient light correction value calculation unit 2410. The processing advances to step S304 if the ambient light correction value has been calculated, and to step S305 if not. Note that, immediately after an instruction to start the ambient light correction processing that has been issued through a user operation has been received, because a correction value has not been generated, the processing advances to step S305.

In step S304, the control unit 210 controls the image processing unit 240, and the image processing unit 240 applies an ambient light correction value to the input image using the correction unit 2402, and generates a corrected image. The ambient light correction value is constituted by a gain and an offset, as described above, and the luminance and color appearance on a projection plane can be corrected by applying the ambient light correction value to the input image. The details of the method of calculating the ambient light correction value will be described later.

In step S305, the control unit 210 controls the light modulation element control unit 250, and the light modulation element control unit 250 doubles the speed of rendering an image to the light modulation element 270. Note that, as will be described later, the speed of driving a panel is doubled in the present embodiment, but the speed may be increased by n times (n is an integer of more than two). Also, in the case where the input image is a still image, the double speed drive need not be performed.

In step S306, the control unit 210 controls the image processing unit 240, and the image processing unit 240 writes the input image (when the correction value was not calculated) or the corrected image (when the correction value is calculated) to the image memory 2404 using the double speed conversion unit 2403. Here, setting is performed so that reading can be performed twice in the time taken to write data to the image memory 2404. Then the field signal is generated and sent to the output switching unit 2407.

In step S307, the control unit 210 controls the image capturing unit 291 and the captured image processing unit 292, and collects captured images of the projection plane for calculating the ambient light correction value.

Here, a method of collecting captured images of the projection plane of the present embodiment will be described using FIG. 4. FIG. 4 is a flowchart illustrating the method of collecting captured images of the projection plane of the present embodiment.

In step S401, the control unit 210 controls the image processing unit 240, and the image processing unit 240 performs the increase processing on a $1^{st}$ subframe image using the increase processing unit 2405, and performs the reduce processing on a $2^{nd}$ subframe image using the reduce processing unit 2406. Here, the setting is such that the appearance of an image obtained by time integrating the projection image of the $1^{st}$ subframe and the projection image of the $2^{nd}$ subframe is the same as the appearance of the projection image after correction. The increase processing unit 2405 performs the increase processing on an input image or a corrected image on the $1^{st}$ subframe side by applying the ambient light distribution colorimetry pattern. Furthermore, the reduce processing unit 2406 performs the reduce processing on an input image or a corrected image on the $2^{nd}$ subframe side by applying the ambient light distribution colorimetry pattern.

Here, the ambient light distribution colorimetry pattern in the present embodiment will be described. The ambient light distribution colorimetry pattern can be generated by applying a gain α to an input image or a corrected image. The gain α is defined in a range 0<α<1. Hereinafter, a description will be given assuming α=0.1. In this case, the gain α needs to be set such that difference can be noticed between the images of the projection plane captured at the time of projecting the $1^{st}$ subframe and $2^{nd}$ subframe.

Next, the increase processing and reduce processing of the present embodiment will be described. In the present embodiment, the increase processing is multiplication processing or multiplication and addition processing, the reduce processing is multiplication processing or multiplication and subtraction processing. The luminance after the increase processing and the luminance after the reduce processing can be described as the following equation (2), where the luminance of a certain pixel of an input image or a corrected image is X, the luminance after the increase processing is Y1, and the luminance after the reduce processing is Y2.

In the case where the increase processing is [multiplication processing and addition processing]:

$$Y1=1.0 \times X + \alpha \times X$$

In the case where the increase processing is [multiplication processing only]:

$$Y1=(1.0+\alpha) \times X$$

In the case where the reduce processing is [multiplication processing and subtraction processing]:

$$Y2=1.0 \times X - \alpha \times X$$

In the case where the reduce processing is [multiplication processing only]:

$$Y2=(1.0-\alpha) \times X \quad (2)$$

The luminance gain value is set to a gain value such that when the luminance gain value is applied to a corrected image and images of the projection plane are captured by the image capturing unit 291, the captured images can be recognized as different images when the corrected image is multiplied by the ambient light distribution colorimetry patterns.

As a result of setting the gain in this way, when the $1^{st}$ subframe and the $2^{nd}$ subframe are projected by switching therebetween, an equation Y1+Y2=X is satisfied as a result of the time integration. That is, a user can only see a corrected projection plane luminance distribution, and the user is unlikely to notice that a test pattern is incorporated.

In the present embodiment, an output image is generated using the equation (2) described above, but the method is not limited thereto. It is sufficient that an integral image obtained by integrating over a frame time when $1^{st}$ and $2^{nd}$ subframe images are displayed by switching therebetween in the same frame is equal to the integral image obtained by integrating the original input image or corrected image over the same frame time. However, it is necessary that the difference between the $1^{st}$ and $2^{nd}$ subframe images continues to carry the image information of the input image or the corrected image.

In step S402, the control unit 210 controls the image processing unit 240, and the image processing unit 240 switches between output images according to the field signal with the output switching unit 2407. When the field signal indicates the $1^{st}$ subframe, an image generated by the increase processing unit 2405 is output. When the field signal indicates the $2^{nd}$ subframe, the output switching unit 2407 switches such that an image generated by the reduce processing unit 2406 is output.

In step S403, the control unit 210 controls the image processing unit 240, and the image processing unit 240 performs gamma processing on an output image using the gamma processing unit 2408, and converts the input image to data in a gamma space.

In step S404, the control unit 210 controls the light modulation element control unit 250 so as to control the light modulation element 270 such that the output image subjected to the gamma processing is projected.

In step S405, the control unit 210 controls the image capturing unit 291, and an image of a projection plane luminance distribution on the projection plane is captured. The captured image is temporarily stored in a memory that is in the captured image processing unit 292.

In step S406, the control unit 210 controls the captured image processing unit 292, and whether or not all of the projection plane captured images necessary for calculating the ambient light correction value have been acquired is determined. If captured images when $1^{st}$ subframe and $2^{nd}$ subframe images of the same frame are projected are collected, the processing advances to step S407. If there is only a captured image when the $1^{st}$ subframe is projected, the processing is returns to step S402, the output image is switched to the $2^{nd}$ subframe and projected, and an image of the projection plane is captured.

Here, the timing of projection and capturing such that the process of acquiring the ambient light distribution is not visually recognized will be described.

In steps S402 to S406, $1^{st}$ and $2^{nd}$ subframe images are projected, and captured images are obtained by capturing the projection plane. The timing of driving the panel and capturing needs to be appropriately controlled such that this process is not visually recognized by a user and the captured images can be properly acquired.

Figure 5:
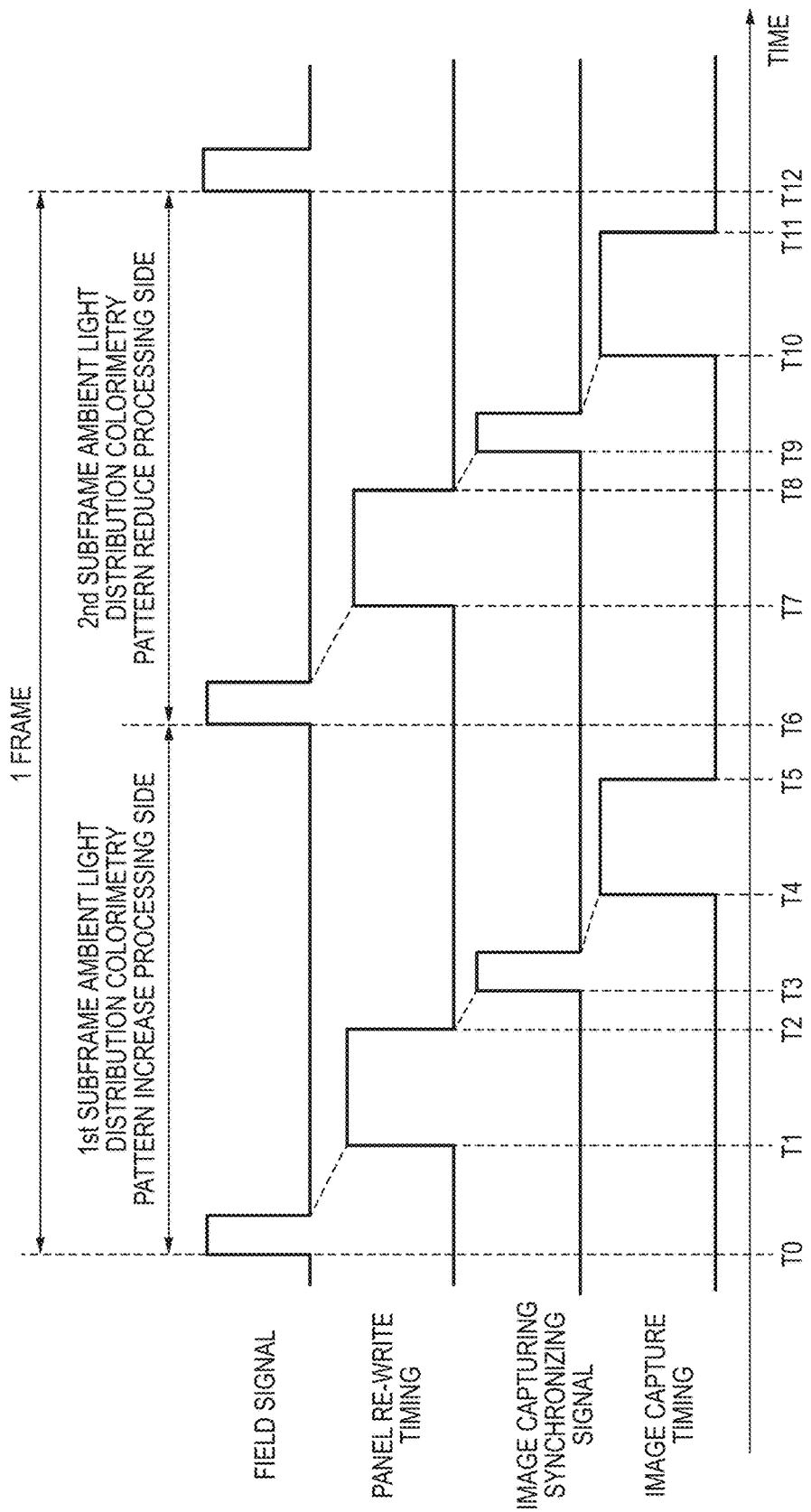
FIG. 5 is a drive timing chart of a liquid crystal panel of the first embodiment.

FIG. 5 is a timing chart of driving a panel, and the timings of projection and capturing of a $1^{st}$ subframe image and projection and capturing of a $2^{nd}$ subframe image are shown. The horizontal axis in FIG. 5 shows time.

First, at time T0, the control unit 210 generates a field signal of the $1^{st}$ subframe.

Upon receiving the field signal, in a period from time T1 to time T2, the light modulation element control unit 250 writes an image generated by the increase processing unit 2405 in the light modulation element 270. The light modulation element control unit 250, upon completing writing, notifies the control unit 210 of the completion.

Next, the control unit 210, upon receiving the completion notification, generates an image capturing synchronizing signal at time T3.

The image capturing unit 291, upon receiving the image capturing synchronizing signal, captures the projection region in a period from time T4 to time T5.

As for the $2^{nd}$ subframe, similarly, the projection region when an image generated by the reduce processing unit 2406 is projected is captured in a period from time T6 to time T11.

As a result of driving the panel in this way, projection images of the $1^{st}$ and $2^{nd}$ subframes can be respectively captured. Also, as a result of performing the increase processing and the reduce processing on an input image using the ambient light distribution colorimetry pattern and switching display, a user does not visually recognize the pattern because the appearance of the projection target is time integrated.

Returning to FIG. 4, in step S407, the control unit 210 controls the captured image processing unit 292, and the projection region is clipped out from the captured image when the $1^{st}$ subframe is projected and the captured image when the $2^{nd}$ subframe is projected. When a projection plane luminance distribution is captured by the image capturing unit 291, information in the surrounding region on the projection plane other than the projection region is usually also captured. Therefore, the information inside the projection region, that is, only the projection plane luminance distribution needs to be clipped out from the captured image.

For example, the projection region may be detected from the difference image between a captured image when the $1^{st}$ subframe is projected and a captured image when the $2^{nd}$ subframe is projected.

After the aforementioned collection processing of captured images of the projection plane is performed, the processing advances to step S308 in FIG. 3.

In step S308, the control unit 210 calculates the ambient light distribution from the projection region clipped images of the $1^{st}$ and $2^{nd}$ subframes.

Figure 6:
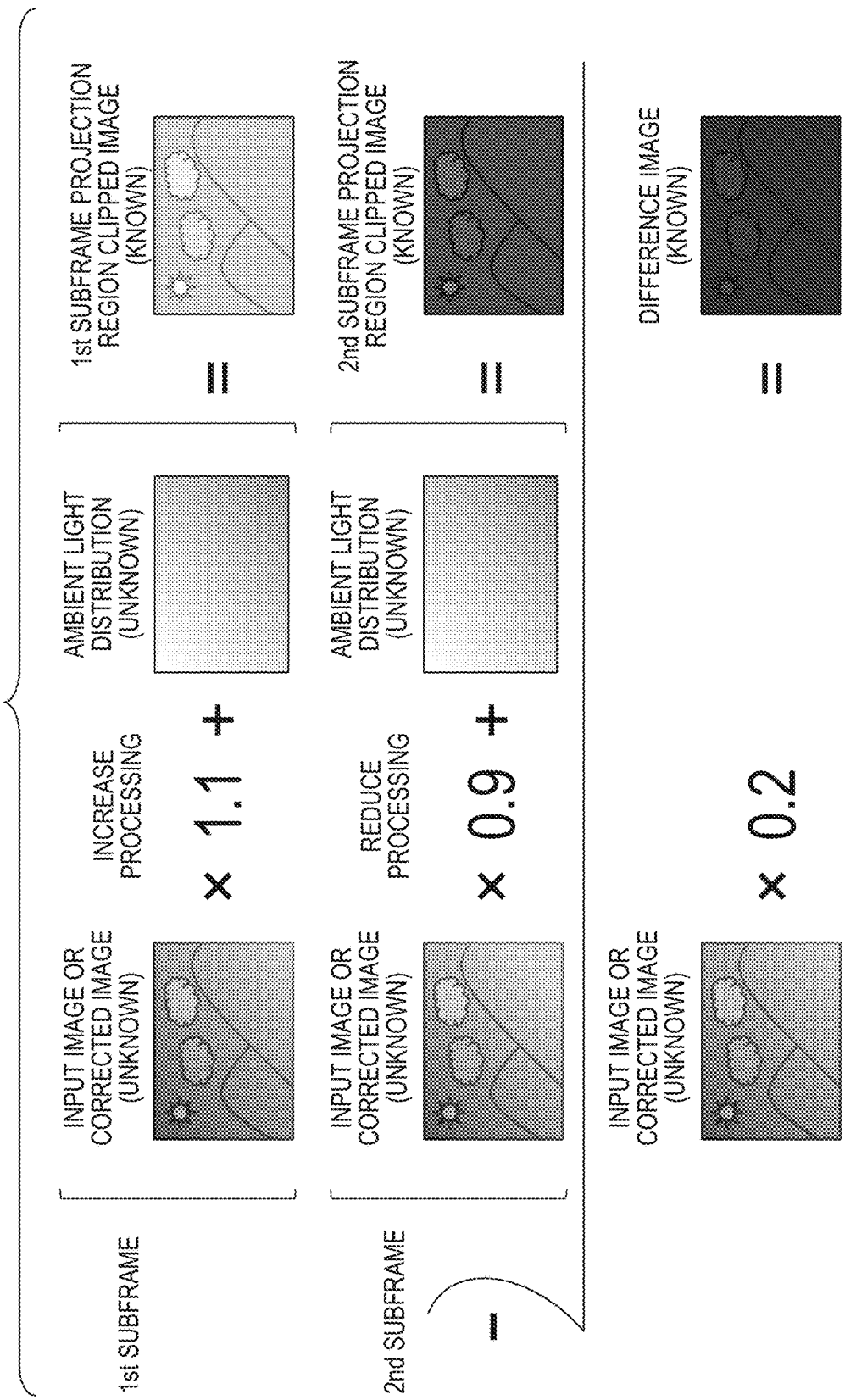
FIG. 6 is a diagram for describing an ambient light distribution detection method of the first embodiment.

Next, the control unit 210 controls the image processing unit 240, and the image processing unit 240 calculates the ambient light distribution from the $1^{st}$ and $2^{nd}$ subframe projection region clipped images with the ambient light distribution calculation unit 2409. FIG. 6 is a schematic diagram illustrating the method of detecting the ambient light distribution in real time from the $1^{st}$ and $2^{nd}$ subframe projection region clipped images. The upper part of FIG. 6 shows the $1^{st}$ subframe and the middle part shows the $2^{nd}$ subframe.

In order to calculate the ambient light distribution, the projection image needs to be obtained. As described above, on the $1^{st}$ subframe side, the processing of increasing the ambient light distribution colorimetry pattern (known) is performed on an input image or a corrected image (unknown), and the resultant image is projected. The ambient light distribution (unknown) is added to this input image or corrected image. This results in the projection plane luminance distribution. The image acquired from an image that is obtained by the image capturing unit 291 capturing this is the $1^{st}$ subframe projection region clipped image (known). From such a relationship, the equation shown in the upper part of FIG. 6 is established.

The same applies to the $2^{nd}$ subframe, and the equation shown in the middle part of FIG. 6 is established.

Here, a description will be given assuming the gain $\alpha=0.1$ similarly to the description of the increase/reduce processing of the ambient light distribution colorimetry pattern. When the difference is obtained between the equation established in the $1^{st}$ subframe and the equation established in the $2^{nd}$ subframe, the equation in the lower part of FIG. 6 is obtained. Because the difference image is known, when the equation in the lower part of FIG. 6 is solved with respect to the input image or the corrected image (unknown), the input image or the corrected image (unknown) can be obtained.

Next, the ambient light distribution is obtained using the calculated input image or the corrected image.

Because the input image or the corrected image on the $1^{st}$ subframe side is now known from the calculation result described above, when the equation in the upper part of FIG. 6 is solved with respect to the ambient light distribution (unknown), the ambient light distribution can be obtained. In this way, the ambient light distribution can be obtained.

According to the procedure described above, the ambient light distribution can be acquired without the user visually recognizing it.

Thereafter, in step S309, the ambient light correction value to be set in the projection apparatus 200 based on the ambient light distribution calculated as described above is calculated. That is, the control unit 210 controls the image processing unit 240, and the image processing unit 240 calculates the ambient light correction value to be applied to an input image based on the ambient light distribution obtained in step S308 with the ambient light correction value calculation unit 2410.

Here, a method of calculating the ambient light correction value constituted by a gain and an offset will be described, as an example.

Figure 7B:
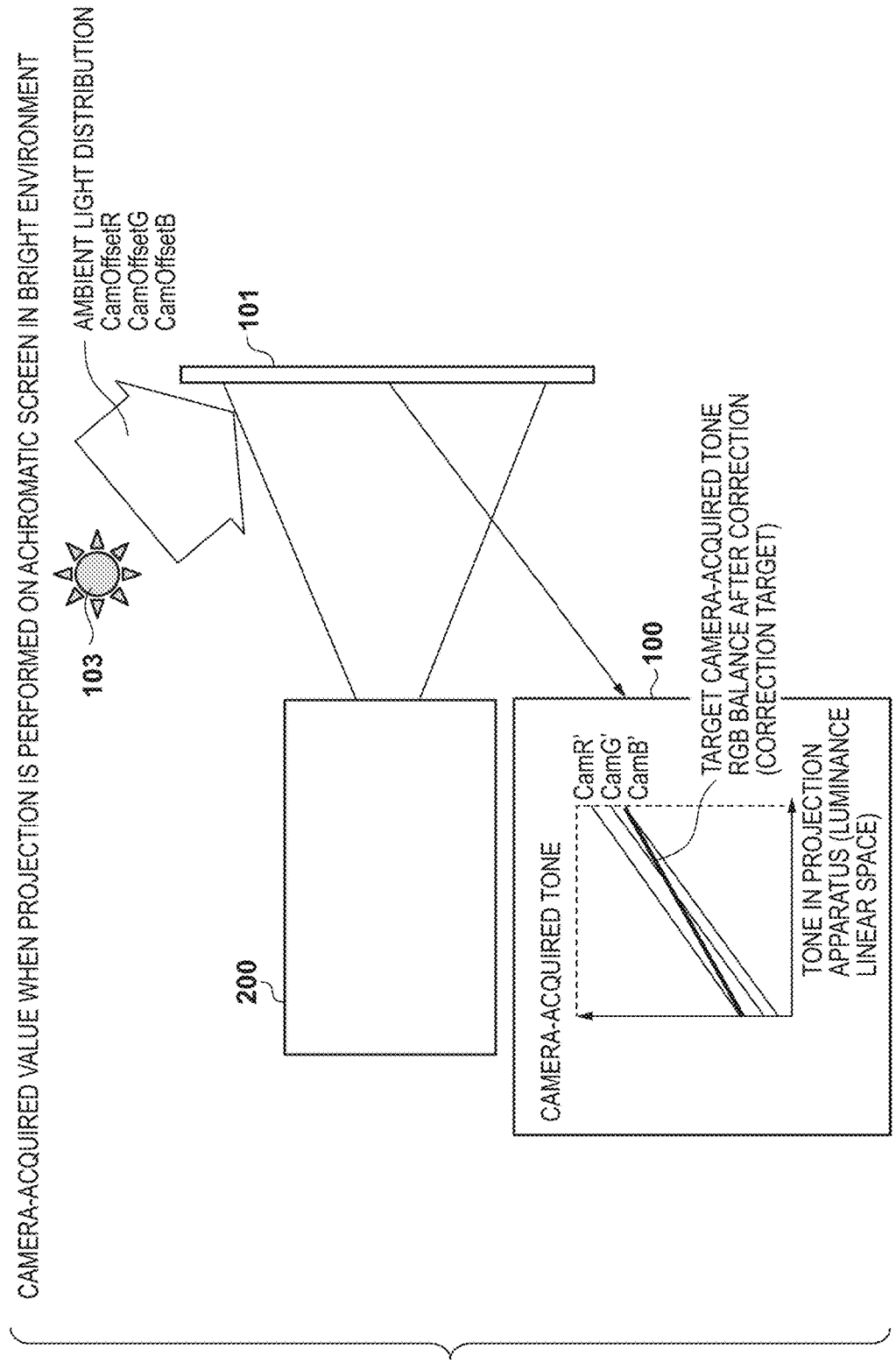

FIGS. 7A and 7B show schematic diagrams of the method of calculating the ambient light correction value constituted by a RGB gain/offset. Note that the following calculation method is an example, and the calculation method is not limited thereto.

The camera-acquired RGB value of the projection plane after correction at the time when the luminance is uniform and the color unevenness is resolved is calculated as the correction target. Then, the correction gain and offset values for respective areas to be set to the projection apparatus such that the projection plane luminance distribution becomes the correction target are calculated.

In each of FIGS. 7A and 7B, in the graph inside the image capturing apparatus 100, the horizontal axis shows the input tone (luminance linear space) of the projection apparatus, and the vertical axis shows the camera-acquired tone.

In a projection environment in which a dark room is used and the projection plane 101 is an achromatic screen, the projection apparatus 200 projects images while the luminance thereof is gradually increased from an all-black image to an all-white image as input images, and the images are captured by the image capturing apparatus 100. FIG. 7A shows the acquired values when the images are captured. Note that it is assumed that calibration has been performed such that the camera-acquired tone has the same value in each of R, G, and B and is linear with respect to the tone value in the luminance linear space of the projection apparatus 200. In this case, the camera-acquired RGB value CamRGB that is obtained when an all-white image is projected onto the achromatic screen in the dark room is stored in the ROM 212 as a correction reference value to be used for calculating the ambient light correction value, for example.

FIG. 7B illustrates, when the projection apparatus 200 projects images while the luminance thereof is gradually increased from an all-black image to an all-white image as input images in the case where the ambient light 103 is incident on the projection plane 101, tone values for the respective images acquired by the image capturing apparatus 100. As shown in FIG. 7B, the projection light is influenced by the previously obtained ambient light distribution CamOffsetRGB, and as a result, the balance between the RGB tones acquired by the image capturing apparatus 100 is lost. In this case, in order to make a correction such that a user recognizes the projection light on the projection plane 101 as white (W), the correction needs to be made such that the RGB balance of the camera-acquired tone becomes 1:1:1 similarly to the balance when calibration has been performed. Therefore, the target camera-acquired tone RGB balance after correction is the thick line in the graph in FIG. 7B. The thick line of the target camera-acquired tone RGB balance after correction is obtained by linearly interpolating between the maximum value of the camera-acquired RGB value CamR', CamG', and CamB' before correction on the dark part and the minimum value of the CamR', CamG', and CamB' on the bright part.

Thereafter, as described above, the ambient light distribution CamOffsetRGB is subtracted from the target camera-acquired RGB after correction, the result is converted to an output tone of the projection apparatus, and as a result, the RGB gain and offset values to be set to the projection apparatus when the ambient light correction is performed can be obtained. A conversion matrix stored in the ROM 212 may be used in order to convert the camera-acquired RGB to the output tone of the projection apparatus.

As described above, according to the present embodiment, the correction value can be calculated and the correction can be performed without the acquisition of the ambient light distribution being visually recognized by a user.

Also, in the present embodiment, when a gain for ambient light detection is applied but the gain cannot be properly applied due to saturation, the ambient light intensity in the region where the gain cannot be properly applied is obtained by performing interpolation from the surrounding regions without applying the gain.

Also, in the present embodiment, the increase processing unit 2405 or the reduce processing unit 2406 embeds the ambient light distribution colorimetry pattern into an input image or a corrected image. In this case, there are cases where, when the increase processing or the reduce processing of a pattern is performed on an input image or a corrected image in step S401, the pattern cannot be applied due to tone saturation, and the ambient light intensity of the region, that is the correction value, cannot be obtained. The correction value of such a region where the pattern cannot be applied may be obtained from the ambient light intensity obtained by interpolating the ambient light intensities obtained by applying the pattern in regions surrounding the region where saturation has occurred.

Also, in the present embodiment, in the case where a gain for ambient light detection is applied, but the gain cannot be properly applied due to saturation, the correction value may be obtained, without applying the gain, by interpolating the correction values obtained in the previous frames or by using the correction value obtained in the previous frame as is without performing interpolation. Also, in the present embodiment, the ambient light distribution is acquired again after a fixed time has elapsed.

Also, in the method described above, the increase processing or the reduce processing of the ambient light distribution colorimetry pattern is performed on a corrected image for every frame, and the ambient light distribution is obtained from the captured images of the projection plane luminance distribution, but the ambient light distribution may be obtained at a predetermined time interval instead of being obtained for every frame. The projection apparatus 200 may include a timer function, and the projection plane may be captured and the ambient light correction may be performed every time a predetermined time has elapsed. In this way, even if the process of obtaining the correction value from captured images cannot be performed for every frame due to the limitations of processing capability of the operation processing apparatus (CPU), the correction can be performed at a fixed time interval and the correction can be properly performed.

Also, in the present embodiment, the correction value is calculated only when the ambient light distribution differs from that obtained previously. Also, because the calculation time increases if the ambient light distribution is calculated for every frame, the configuration may be such that the ambient light distribution obtained previously is temporarily saved, the saved ambient light distribution is compared with the current ambient light distribution in step S309, and the ambient light correction value is calculated only when there is a change.

Second Embodiment

Next, the processing in which the ambient light distribution and the pattern color distribution on a projection plane are detected and corrected in real time will be described as a second embodiment.

In the first embodiment, a method in which the ambient light distribution that follows changes in ambient light in real time is obtained, and a correction value is calculated using the obtained ambient light distribution is described. In the second embodiment, not only the ambient light distribution, but the distribution of a pattern color on a projection plane is detected, and correction is performed in real time.

Hereinafter, an outline of an algorithm of the pattern color correction of the present embodiment will be described.

First, how the appearance on a projection plane will be affected when projection is performed onto a projection target having a pattern color will be described using FIGS. 8A and 8B.

FIG. 8A is a schematic diagram of a case where the pattern color correction is not performed. As shown in FIG. 8A, when an all-white image is projected as the input image from a projection apparatus 900 onto a projection plane 801 having a pattern color, the RGB balance of reflected light is lost due to the pattern color on the projection plane 801, and as a result, the pattern color on the projection plane can be seen. As shown in FIG. 8A, the image captured by the image capturing apparatus 900 is not an all-white image, but is an image of the pattern color on the projection plane. In this way, the pattern color on a projection plane affects the luminance distribution on the projection plane. The correction that is performed such that, when an input image is projected, the influence of the pattern color on a projection plane on the luminance distribution on the projection plane is not noticeable is referred to as pattern color correction.

FIG. 8B is a schematic diagram of a case where the pattern color correction is performed.

In a conventional method, the pattern color distribution (balance of RGB reflectance: RGB gain) on a projection plane is obtained using a captured image of the projection plane when an all-white image is projected. A pattern color correction value (gains of RGB colors) to be set to the projection apparatus 900 is obtained, from the calculated pattern color distribution, such that the acquired RGB balance of the image capturing apparatus 100 has the same value as that when projection is performed on an achromatic screen and an image is captured. In the case where the color on the projection plane is not a single color, and is not uniform over the plane as a pattern color, the correction gain value needs to be changed for each area, and the pattern color correction value is stored as a 2D table. When an all-white image is the input image, as shown in FIG. 8B, a pattern color correction value that is generated according to the pattern color on the projection plane 801 is applied to the input image, and as a result, the projection plane luminance distribution is a single gray color, and the pattern color becomes unnoticeable.

With the method described above, the pattern color correction using the RGB gain for each area can be performed.

Also, even in a case where a pattern color and ambient light are present together, the correction can be performed with the gain and offset for each area, similarly to the first embodiment. Details of the method of calculating the correction value and the like will be described later.

Figure 9A:
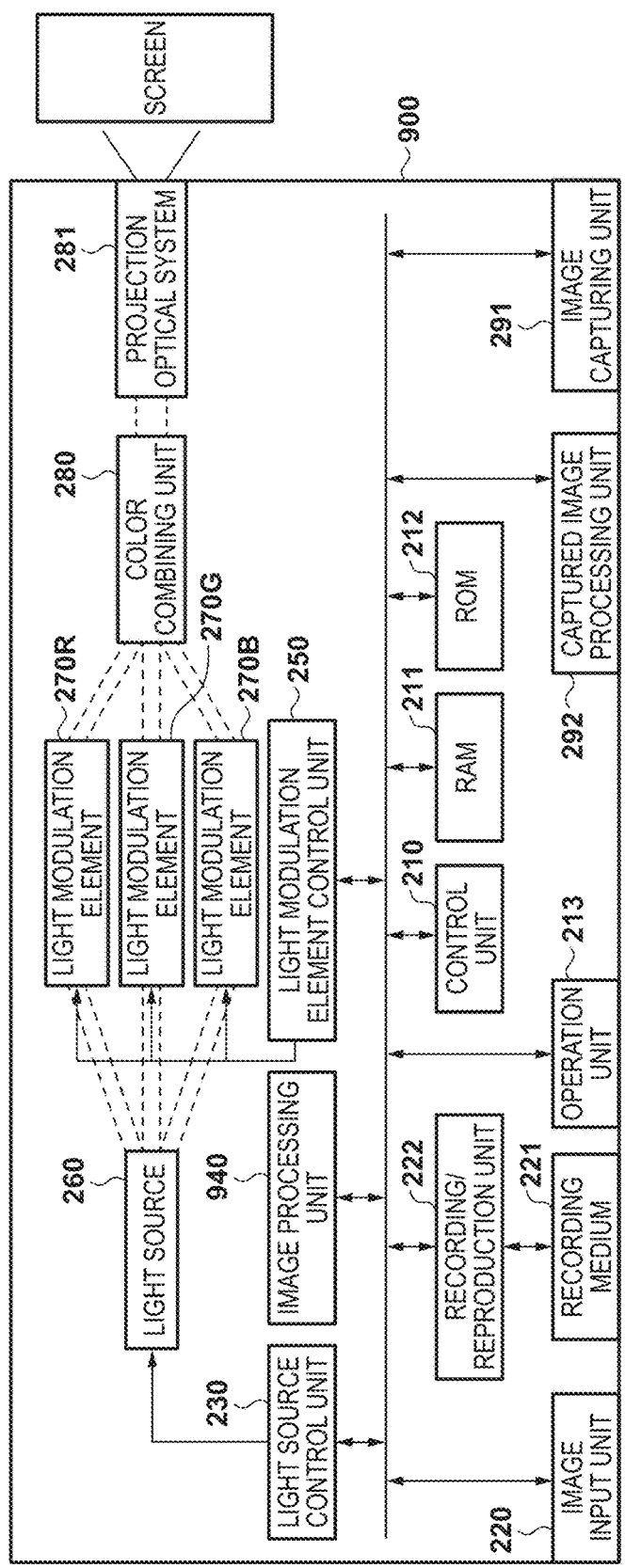

Next, the apparatus configuration of the second embodiment will be described. FIG. 9A shows a block diagram of the projection apparatus 900 of the present embodiment, and FIG. 9B shows a block diagram of an image processing unit 940. In the present embodiment, the internal configuration of the image processing unit 940 is different from that in the first embodiment described above.

Hereinafter, the internal configuration of the image processing unit 940 in FIG. 9B will be described.

A de-gamma processing unit 9401 performs de-gamma processing on an input image, and converts the input image to data in a luminance linear space. A correction unit 9402 corrects the input image by applying a calculated pattern color and ambient light correction value to the input image that has been converted to data in the luminance linear space.

A double speed conversion unit 9403 writes each piece of input frame image data in an image memory 9404, and generates a plurality of pieces of subframe image data with respect to one input frame image data. The basic operation is the same as that of the double speed conversion unit 2403 in the first embodiment, but in the second embodiment, the drive is performed at quadruple speed. A corrected image is written in and temporarily saved in the image memory 9404.

A pattern color distribution colorimetry pattern increase processing unit 9405 generates an image that is equivalent to the image obtained by adding a test pattern (hereinafter, pattern color distribution colorimetry pattern) for detecting the pattern color distribution in the projection environment to a $1^{st}$ subframe image generated by the double speed conversion unit 9403.

A pattern color distribution colorimetry pattern reduce processing unit 9406 generates an image that is equivalent to the image obtained by subtracting the pattern color distribution colorimetry pattern from a $2^{nd}$ subframe image generated by the double speed conversion unit 9403.

An ambient light distribution colorimetry pattern increase processing unit 9407 and an ambient light distribution colorimetry pattern reduce processing unit 9408 are respectively similar to the ambient light distribution colorimetry pattern increase processing unit 2405 and the ambient light distribution colorimetry pattern reduce processing unit 2406 in the first embodiment, and therefore the description thereof will be omitted. As a result, the $1^{st}$ to $4^{th}$ subframe images are each an image that is different from the input image or the corrected image.

An output switching unit 9409 switches between output images so as to perform output in accordance with a field signal from the double speed conversion unit 9403 in synchronization with the vertical synchronizing signal of subframes after double speed conversion. The outputs from the pattern color distribution colorimetry pattern increase processing unit 9405, the pattern color distribution colorimetry pattern reduce processing unit 9406, the ambient light distribution colorimetry pattern increase processing unit 9407, and the ambient light distribution colorimetry pattern reduce processing unit 9408 are switched.

In the present embodiment, in order to detect the pattern color, the output of the pattern color distribution colorimetry pattern increase processing unit 9405 is projected as the $1^{st}$ subframe and the output of the pattern color distribution colorimetry pattern reduce processing unit 9406 is projected as the $2^{nd}$ subframe. Also, in order to detect the ambient light distribution, the output of the ambient light distribution colorimetry pattern increase processing unit 9407 is projected as the $3^{rd}$ subframe, and the output of the ambient light distribution colorimetry pattern reduce processing unit 9408 is projected as the $4^{th}$ subframe.

A gamma processing unit 9410 applies the gamma of the display apparatus, and converts the image output from the output switching unit 9409 to data in a gamma space.

A pattern color distribution calculation unit 9411 calculates the pattern color distribution from a $1^{st}$ subframe projection region clipped image and a $2^{nd}$ subframe projection region clipped image that are generated by the captured image processing unit 292. The pattern color distribution as mentioned here refers to the RGB gain values for respective panel pixels that are obtained according to the reflectance of the projection plane.

An ambient light distribution calculation unit 9412 calculates the ambient light distribution from a $3^{rd}$ subframe projection region clipped image and a $4^{th}$ subframe projection region clipped image that are generated by the captured image processing unit 292, as well as the pattern color distribution obtained by the pattern color distribution calculation unit 9411.

A visual environment correction value calculation unit 9413 calculates a visual environment correction value for correcting the luminance and color appearance on the projection plane from the calculated pattern color and ambient light distribution. The visual environment correction value as mentioned here is a matrix of the RGB gains and offsets of the respective panel pixels. As a result of applying the visual environment correction value to the input image, the luminance and color appearance on the projection plane viewed from a user can be corrected.

Ambient Light Correction Processing

Next, the processing in which the detection of visual environment data (pattern color distribution and ambient light distribution) of a projection region is performed by the projection apparatus 900 of the present embodiment without being visually recognized by a user, and the color appearance of a projection target is corrected will be described using FIG. 10 to FIGS. 13A and 13B.

FIG. 10 shows a flowchart of the ambient light correction processing of the present embodiment. Hereinafter, a description will be given focusing on the differences from that of FIG. 3.

In step S1003, the control unit 210 controls the image processing unit 940, the image processing unit 940 determines whether or not a visual environment correction value was calculated in the past by the visual environment correction value calculation unit 9413, and the processing advances to step S1004 if the visual environment correction value was calculated, and to step S1005 if not.

In step S1004, the control unit 210 controls the image processing unit 940, and the image processing unit 940 applies the visual environment correction value to an input image and a corrected image is generated by the correction unit 9402. The visual environment correction value is constituted by a gain and an offset, and as a result of applying the visual environment correction value to the input image, the luminance and color appearance on the projection plane can be corrected. Details of the method of calculating the visual environment correction value will be described later.

In step S1005, the control unit 210 controls the light modulation element control unit 250, and the light modulation element control unit 250 performs control such that the speed at which an image is rendered to the light modulation element 270 is quadrupled. Note that, in the present embodiment, the panel is driven at quadruple speed, but may be driven at n-times speed (n is an integer of more than four). Also, in the case where the input image is a still image, the double speed drive need not be performed. Also, in the present embodiment, quadruple speed drive has been adopted in the case where both the pattern color correction value and the ambient light correction value are calculated in one frame. The correction values can be respectively obtained from two separate frames, and in this case, double speed drive is adopted, the pattern color correction value and the ambient light correction value may be respectively generated from the first and second frames.

In step S1006, the control unit 210 controls the image processing unit 940, and the image processing unit 940 writes the input image (when the correction value was not calculated) or the corrected image (when the correction value was calculated) to the image memory 9404 with the double speed conversion unit 9403. Here, setting is performed so that reading can be performed four times in the time taken to write data to the image memory 2404. Then the field signal is generated and sent to the output switching unit 9409.

In step S1007, the control unit 210 collects captured images of the projection plane for calculating the visual environment correction value.

Here, the method of collecting the projection plane captured image of the present embodiment will be described using FIG. 11. FIG. 11 is a flowchart illustrating the method of collecting captured image of the projection plane of the present embodiment.

In step S1101, the control unit 210 controls the image processing unit 940, and performs the increase processing of the pattern color distribution colorimetry pattern on the $1^{st}$ subframe image, the reduce processing of the pattern color distribution colorimetry pattern on the $2^{nd}$ subframe image, the increase processing of the ambient light distribution colorimetry pattern on the $3^{rd}$ subframe image, and the reduce processing of the ambient light distribution colorimetry pattern on the $4^{th}$ subframe image. First, the pattern color distribution colorimetry pattern increase processing unit 9405 adds the pattern color distribution colorimetry pattern to the image on the $1^{st}$ subframe side, and the pattern color distribution colorimetry pattern reduce processing unit 9406 reduces the pattern color distribution colorimetry pattern from the image on the $2^{nd}$ subframe side. Also, the ambient light distribution colorimetry pattern increase processing unit 9407 adds the ambient light distribution colorimetry pattern to the image on the $3^{rd}$ subframe side, and the ambient light distribution colorimetry pattern reduce processing unit 9408 reduces the ambient light distribution colorimetry pattern from the image on the $4^{th}$ subframe side.

In the present embodiment, the pattern color colorimetry pattern is a luminance offset that is uniform over the plane. The luminance offset value is set to an offset value such that when the luminance offset value is applied to a corrected image, and the image capturing unit 291 captures the projection plane, the captured images of the $1^{st}$ and $2^{nd}$ subframes can be recognized as different images. The ambient light distribution colorimetry pattern is the same as that in the first embodiment, and therefore the description thereof will be omitted.

In the present embodiment, the pattern color colorimetry pattern is added to an input image or a corrected image on the $1^{st}$ subframe side, and subtraction is performed on the $2^{nd}$ subframe side. However, the method is not limited thereto. It is sufficient that an integral image obtained by integrating over a frame time when $1^{st}$ and $2^{nd}$ subframe images are displayed by switching therebetween in the same frame is equal to the integral image obtained by integrating the original input image or corrected image over the same frame time. The same applies to the $3^{rd}$ and $4^{th}$ subframe images. However, in the case of the $3^{rd}$ and $4^{th}$ subframe images, it is necessary that the difference therebetween continues to carry the image information of the input image or the corrected image.

Figure 4:
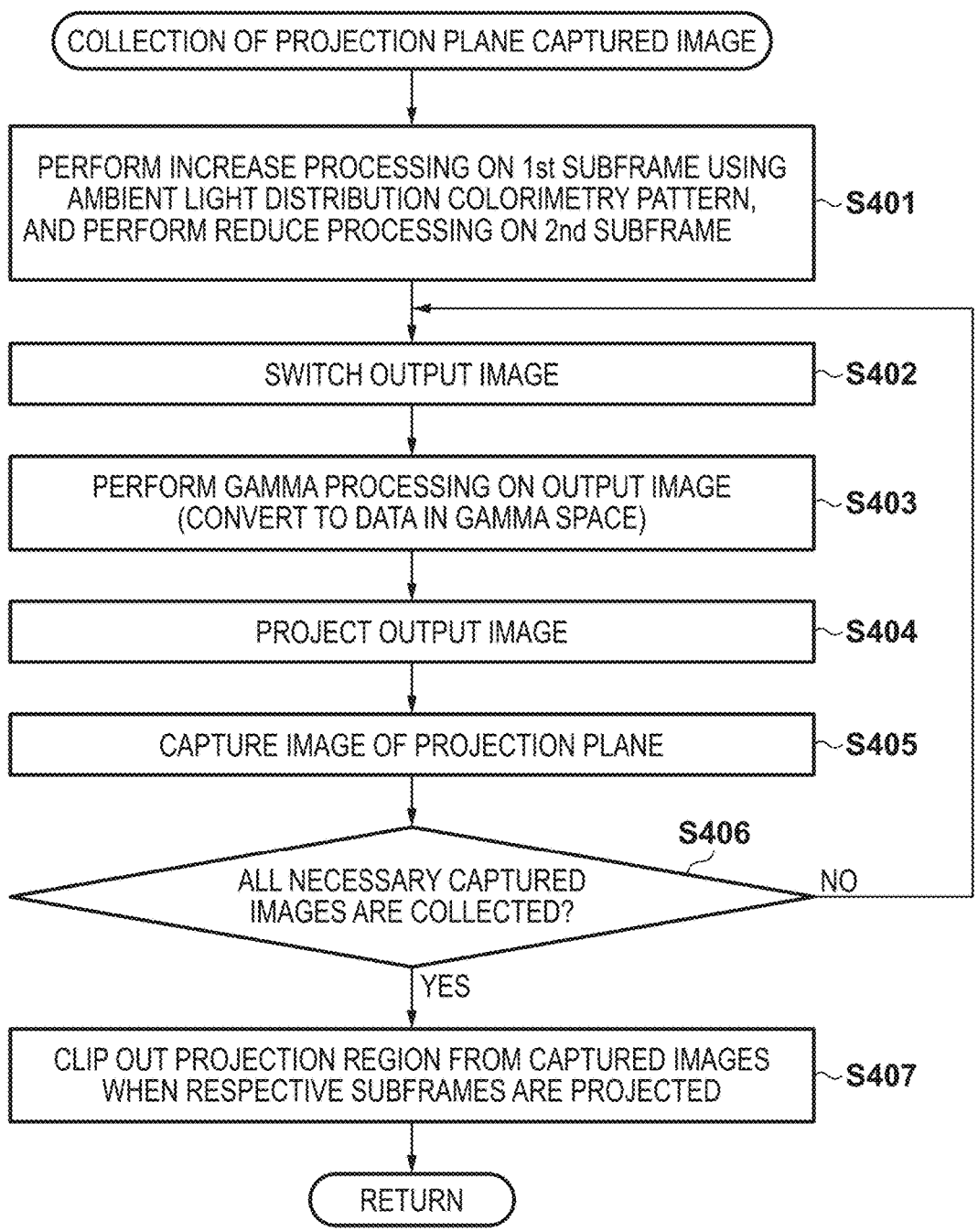
FIG. 4 is a flowchart illustrating processing for collecting a captured image of the first embodiment.

The processing in steps S1102 to S1107 is the same processing in steps S402 to S407 in FIG. 4, and therefore a description thereof will be omitted.

After the projection plane captured images necessary for performing correction are collected with the procedure described above, the processing advances to step S1008.

In step S1008, the control unit 210 controls the image processing unit 940, and the image processing unit 940 calculates the pattern color distribution from the $1^{st}$ and $2^{nd}$ subframe projection region clipped images with the pattern color distribution calculation unit 9411.

FIG. 12A shows a schematic diagram of the pattern color distribution calculation method.

In each element, the input image or the corrected image, the pattern color distribution colorimetry pattern, the ambient light distribution, and each clipped image are constituted by a two-dimensional array of color information such as camera-acquired RGB or XYZ tristimulus values, for example. The pattern color distribution is a two-dimensional array of gains that are applied to pieces of color information such as RGB or XYZ.

The equation in the upper part is an equation in the $1^{st}$ subframe, and the equation in the middle part is an equation in the $2^{nd}$ subframe. The equation in the lower part in FIG. 12A is obtained by taking the difference between the equation in the $1^{st}$ subframe and the equation in the $2^{nd}$ subframe. In the equation in the lower part, only the pattern color distribution is an unknown element, and as a result of solving the equations with respect to the pattern color distribution, the pattern color distribution can be obtained.

In step S1009, the control unit 210 controls the image processing unit 940, and the image processing unit 940 calculates the ambient light distribution from the projection region clipped images of the $3^{rd}$ and $4^{th}$ subframes and the pattern color distribution acquired in step S1008 with the ambient light distribution calculation unit 9412.

Figure 12B:
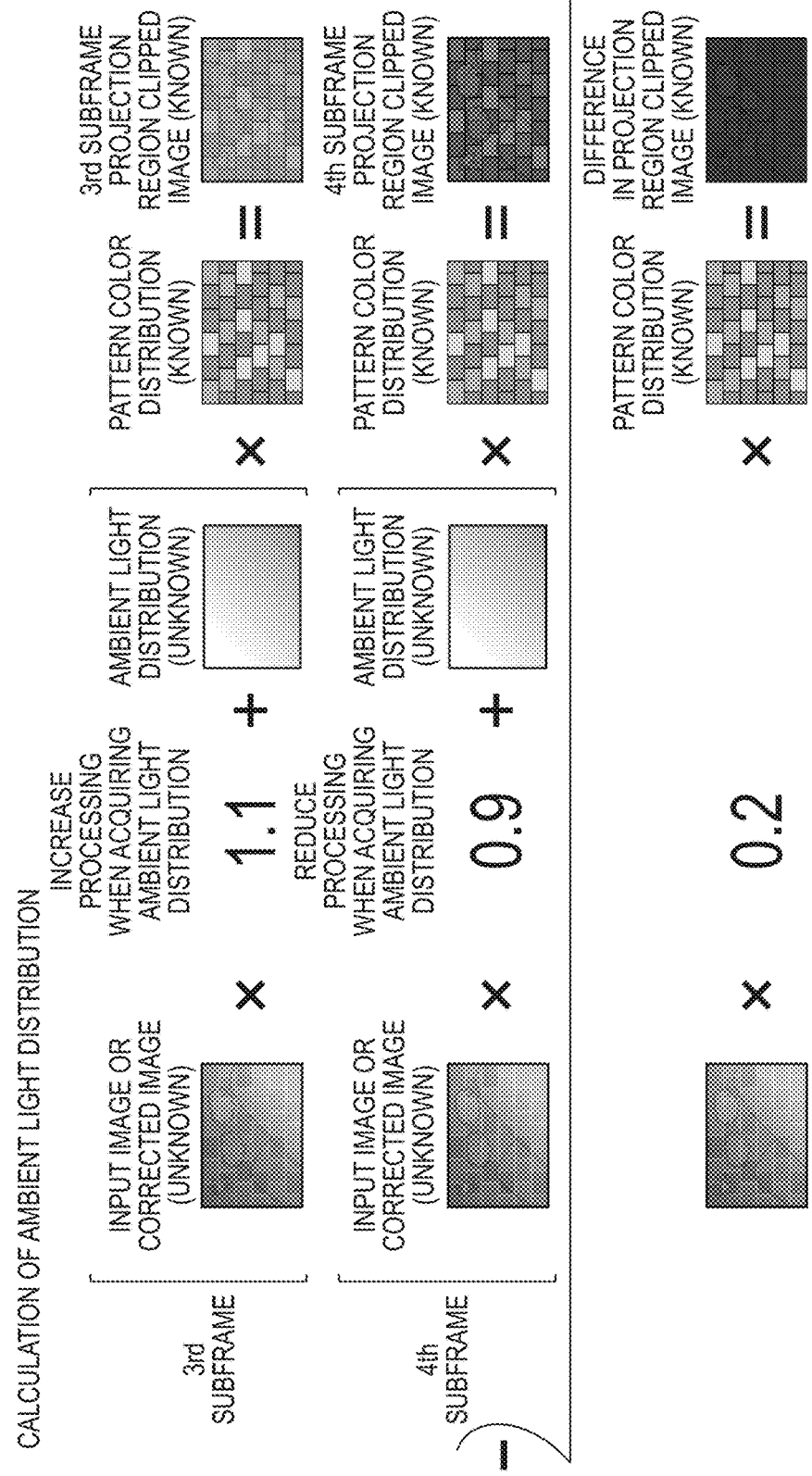
Figure 14:
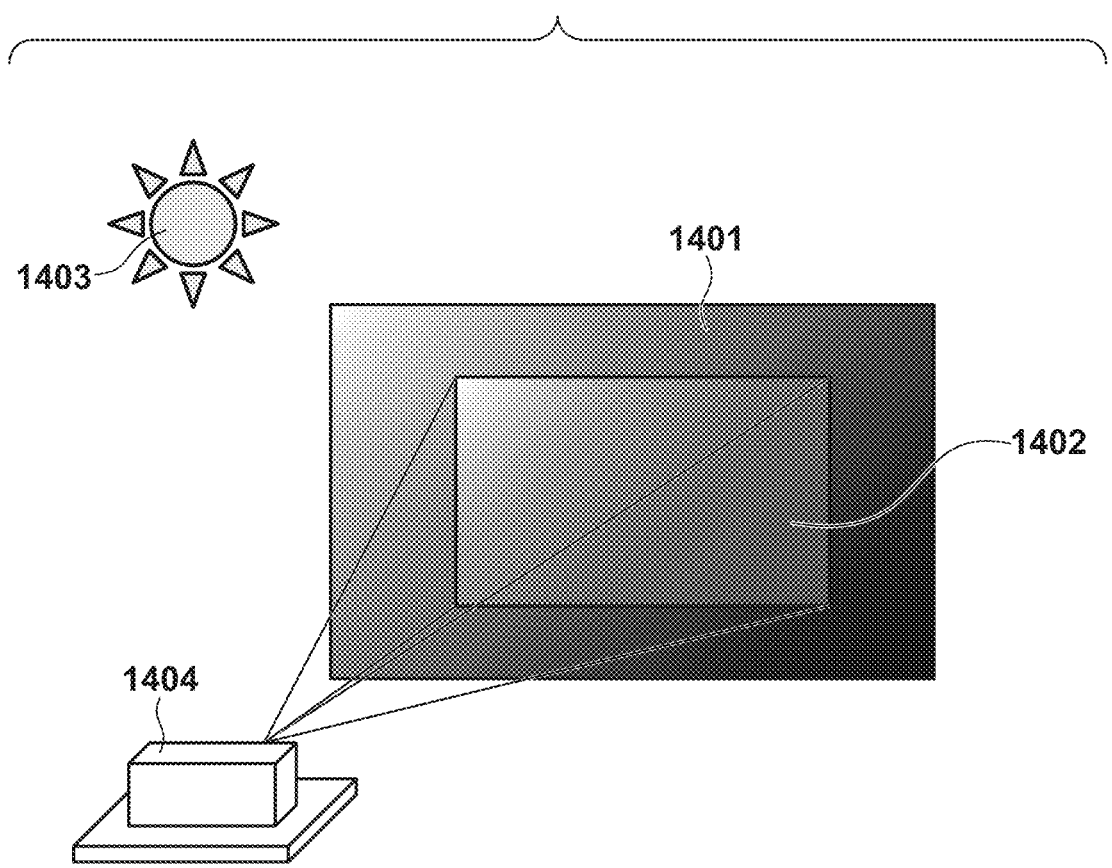
FIG. 14 is a diagram illustrating a projection state under ambient light.

FIG. 12B shows a schematic diagram of the ambient light distribution calculation method. The upper and middle parts respectively show the equations in the $3^{rd}$ and $4^{th}$ subframes. The calculation method is almost the same as the ambient light distribution calculation method in the first embodiment. The calculation method only differs therefrom in that the pattern color distribution calculated in the process described above is used in the calculation process. Therefore, a detailed description will be omitted.

In step S1010, the control unit 210 controls the image processing unit 940, and the image processing unit 940 calculates the visual environment correction value to be applied to an input image based on the pattern color and ambient light distribution calculated in step S1009 with the visual environment correction value calculation unit 9413.

Here, a method of calculating the visual environment correction value constituted by a gain and an offset will be described, as an example. Note that the following calculation method of the correction value is an example, and the calculation method is not limited thereto.

FIGS. 13A and 13B are schematic diagrams illustrating the visual environment correction with the RGB gain/offset. Even though the pattern color distribution is included as an element, the correction can be performed with the RGB gain and offset.

FIG. 13A illustrates the camera-acquired RGB in the case where images are sequentially projected onto the projection plane 101, which is an achromatic screen, in a dark room while the luminance of the images is gradually increased from an all-black image to an all-white image. FIG. 13B illustrates a case where projection is performed on the projection plane 801, which is a colored screen, in a bright environment. The projection image is affected by the ambient light in a form of offset, and is affected by the pattern color in the form of a gain. The concept is the same as that of the ambient light correction in the first embodiment.

As shown in the thick line in the graph in FIG. 13B, the target camera-acquired RGB balance after correction is obtained by linearly interpolating between the maximum value of the camera-acquired RGB value CamR', CamG', and CamB' before correction on the dark part and the minimum value of the CamR', CamG', and CamB' on the bright part. Then, the target camera-acquired RGB after correction is divided by the pattern color distribution CamGainRGB obtained as described above. Thereafter, the ambient light distribution CamOffsetRGB is subtracted from the obtained result, and the resultant value is converted to an output tone of the projection apparatus, and as a result, the RGB gain and offset values to be set to the projection apparatus when visual environment correction is performed can be obtained.

As described above, according to the present embodiment, the correction value can be calculated and correction can be performed without the acquisition of the pattern color/ambient light distribution being visually recognized by a user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-235367, filed Dec. 2, 2016 which is hereby incorporated by reference herein in its entirety.

What is claimed is:

1. An image processing apparatus that outputs an image to a display unit, the image processing apparatus comprising:

at least one processor and/or at least one circuit to perform the operations of the following units:
(a) an image processing unit configured to generate (1) a first image by increasing brightness of an image with a first pattern for measuring an ambient light distribution, and (2) a second image by decreasing brightness of the image with the first pattern, the second image being different from the first image;
(b) an outputting unit configured to output the first image and the second image to the display unit such that the first image and the second image are switched and displayed;
(c) an acquisition unit configured to acquire (1) a first captured image corresponding to an image displayed by the display unit based on the first image and (2) a second captured image corresponding to an image displayed by the display unit based on the second image; and
(d) a correction unit configured to generate a corrected image based on the first captured image and the second captured image so as to reduce an effect of an ambient light distribution with respect to an image displayed by the display unit.

2. The apparatus according to claim 1, further comprising: an image capturing unit configured to capture a region including an image displayed by the display unit.

3. The apparatus according to claim 1, wherein the image processing unit is configured to generate (a) a third image by processing the image with a second pattern for measuring a pattern color distribution, and (b) a fourth image that is different from the third image,
wherein the acquisition unit is configured to acquire a pattern color distribution based on captured images of a region in which the third image and the fourth image are displayed, and
wherein the correction value calculation unit is configured to calculate the correction value based on at least one of the ambient light distribution and the pattern color distribution that are obtained by the acquisition unit.

4. The apparatus according to claim 3, wherein the outputting unit is configured to output the first image, the second image, the third image, and the fourth image to the display unit,
wherein an integral image within a time when the first image and the second image are displayed is equal to an integral image generated by integrating the image over the time, and
wherein an integral image within a time when the third image and the fourth image are displayed is equal to an integral image generated by integrating the image over the time.

5. The apparatus according to claim 3, wherein the image processing unit:
generates the first image by increasing the image with the first pattern;
generates the second image by reducing the image with the first pattern;
generates the third image by increasing the image with the second pattern; and
generates the fourth image by reducing the image with the second pattern.

6. The apparatus according to claim 1, wherein, when a region of the image where tone is saturated is detected by the image processing unit, the image processing unit does not perform the increasing or the decreasing brightness of the region of the image, and wherein the correction unit applies a correction value calculated in a previous processing.

7. An image processing method that outputs an image to a display unit, the method comprising:
generating (1) a first image by increasing brightness of an image with a first pattern for measuring an ambient light distribution, and (2) a second image by decreasing brightness of the image with the first pattern, the second image being different from the first image;
outputting the first image and the second image to the display unit such that the first image and the second image are switched and displayed;
acquiring (1) a first captured image corresponding to an image displayed by the display unit based on the first image and (2) a second captured image corresponding to an image displayed by the display unit based on the second image; and
generating a corrected image based on the first captured image and the second captured image so as to reduce an effect of an ambient light distribution with respect to an image displayed by the display unit.

8. A non-transitory computer-readable storage medium storing a program for causing a computer to execute an image processing method that outputs an image to a display unit, the method comprising:
generating (1) a first image by increasing brightness of an image with a first pattern for measuring an ambient light distribution, and (2) a second image by decreasing brightness of the image with the first pattern, the second image being different from the first image;
outputting the first image and the second image to the display unit such that the first image and the second image are switched and displayed;
acquiring (1) a first captured image corresponding to an image displayed by the display unit based on the first image and (2) a second captured image corresponding to an image displayed by the display unit based on the second image; and
generating a corrected image based on the first captured image and the second captured image so as to reduce an effect of an ambient light distribution with respect to an image displayed by the display unit.

9. The apparatus according to claim 1, wherein the correction unit calculates a correction value based on the first captured image and the second captured image, and corrects an input image using the correction value.

10. The apparatus according to claim 9, wherein the correction unit calculates a correction value for each frame of the image.

11. The apparatus according to claim 9, wherein the correction unit calculates a correction value every predetermined time interval.

12. The apparatus according to claim 9, wherein the correction unit calculates the correction value when an ambient light distribution or a pattern color distribution differs from that calculated in the previous processing.

13. An image processing apparatus that outputs an image to a display unit, the image processing apparatus comprising:
at least one processor and/or at least one circuit to perform the operations of the following units:
(a) an image processing unit configured to generate (1) a first image by increasing brightness of an image with a first gain and (2) a second image by decreasing brightness of the image with a second gain, for measuring an ambient light distribution;

(b) an outputting unit configured to output the first image and the second image to the display unit such that the first image and the second image are switched and displayed;

(c) an acquisition unit configured to acquire (1) a first captured image corresponding to an image displayed by the display unit based on the first image and (2) a second captured image corresponding to an image displayed by the display unit based on the second image; and (d) a correction unit configured to generate a corrected image based on the first captured image and the second captured image so as to reduce an effect of an ambient light distribution with respect to an image displayed by the display unit.

14. The apparatus according to claim 13, further comprising:
an image capturing unit configured to capture a region including an image displayed by the display unit.

15. The apparatus according to claim 13, wherein, a sum of the first gain and the second gain is 1.

16. The apparatus according to claim 13, wherein the display unit is a projection unit to project an image on a screen.

17. An image processing method that outputs an image to a display unit, the method comprising:

generating (1) a first image by increasing brightness of an image with a first gain and (2) a second image by decreasing brightness of the image with a second gain, for measuring an ambient light distribution;

outputting the first image and the second image to the display unit such that the first image and the second image are switched and displayed;

acquiring (1) a first captured image corresponding to an image displayed by the display unit based on the first image and (2) a second captured image corresponding to an image displayed by the display unit based on the second image; and generating a corrected image based on the first captured image and the second captured image so as to reduce an effect of an ambient light distribution with respect to an image displayed by the display unit.

18. A non-transitory computer-readable storage medium storing a program for causing a computer to execute an image processing method that outputs an image to a display unit, the method comprising:

generating (1) a first image by increasing brightness of an image with a first gain and (2) a second image by decreasing brightness of the image with a second gain, for measuring an ambient light distribution;

outputting the first image and the second image to the display unit such that the first image and the second image are switched and displayed;

acquiring (1) a first captured image corresponding to an image displayed by the display unit based on the first image and (2) a second captured image corresponding to an image displayed by the display unit based on the second image; and generating a corrected image based on the first captured image and the second captured image so as to reduce an effect of an ambient light distribution with respect to an image displayed by the display unit.

* * * * *